(12) United States Patent
Sudo et al.

(10) Patent No.: US 10,964,344 B2
(45) Date of Patent: Mar. 30, 2021

(54) MAGNETIC DISK DEVICE HAVING TWO REGIONS OF DIFFERENT THICKNESSES

(71) Applicants: Kabushiki Kaisha Toshiba, Tokyo (JP); Toshiba Electronic Devices & Storage Corporation, Tokyo (JP)

(72) Inventors: Daisuke Sudo, Yokohama Kanagawa (JP); Tatsurou Sasamoto, Tokyo (JP); Takeyori Hara, Kawasaki Kanagawa (JP); Akihiko Takeo, Tokyo (JP); Kazuo Chokki, Fujisawa Kanagawa (JP); Tatsuo Nitta, Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/787,407

(22) Filed: Feb. 11, 2020

(65) Prior Publication Data
US 2020/0176026 A1    Jun. 4, 2020

Related U.S. Application Data

(62) Division of application No. 16/111,927, filed on Aug. 24, 2018, now Pat. No. 10,600,437.

(30) Foreign Application Priority Data

Mar. 22, 2018    (JP) .............................. JP2018-055356

(51) Int. Cl.
*G11B 5/53* (2006.01)
*G11B 20/12* (2006.01)
(Continued)

(52) U.S. Cl.
CPC ............ *G11B 5/53* (2013.01); *G11B 20/1217* (2013.01); *G11B 5/54* (2013.01); *G11B 5/5539* (2013.01);
(Continued)

(58) Field of Classification Search
None
See application file for complete search history.

(56) References Cited

U.S. PATENT DOCUMENTS 5,324,593 A * 6/1994 Lal .................... C23C 14/165
428/610
5,520,981 A * 5/1996 Yang .................... G11B 5/54
360/135

(Continued)

FOREIGN PATENT DOCUMENTS

| JP | 5150745 B2 | 2/2013 |
| JP | 2014-182855 A | 9/2014 |
| JP | 2017-10602 A | 1/2017 |

*Primary Examiner* — Tan X Dinh
(74) *Attorney, Agent, or Firm* — White & Case LLP

(57) ABSTRACT

According to one embodiment, a magnetic disk device includes a disk including a first region and a second region different from the first region, a head that writes data on the disk and reads data from the disk, an actuator that positions the head on the disk, and a controller which positions the head by driving the actuator and writes data in the first region and the second region with the head, a skew angle of the head with respect to a circumferential direction of the disk varying within a first angle in the first region, and varying, in the second region, from a second angle larger than the first angle to a third angle larger than the first angle and the second angle.

2 Claims, 18 Drawing Sheets

(51) Int. Cl.
*G11B 5/596* (2006.01)
*G11B 5/54* (2006.01)
*G11B 5/55* (2006.01)
*G11B 20/20* (2006.01)

(52) U.S. Cl.
CPC .......... *G11B 5/59633* (2013.01); *G11B 20/20* (2013.01); *G11B 2020/1238* (2013.01)

(56) References Cited

U.S. PATENT DOCUMENTS

| | | | |
|---|---|---|---|
| 5,724,212 A | 3/1998 | Mallary et al. | |
| 5,736,020 A * | 4/1998 | Lal | G11B 5/54 |
| | | | 204/298.06 |
| 5,822,163 A * | 10/1998 | Lee | G11B 5/725 |
| | | | 360/135 |
| 6,324,032 B1 | 11/2001 | Ohtsuka et al. | |
| 6,416,839 B1 * | 7/2002 | Xuan | G11B 5/8408 |
| | | | 360/135 |
| 6,437,947 B1 | 8/2002 | Uno | |
| 9,824,703 B2 | 11/2017 | Sugawara et al. | |
| 9,837,106 B1 | 12/2017 | Contreras et al. | |
| 2009/0195925 A1 * | 8/2009 | Kikitsu | G11B 5/855 |
| | | | 360/110 |
| 2012/0236432 A1 | 9/2012 | Sudo | |
| 2014/0285923 A1 | 9/2014 | Aoki | |
| 2015/0016236 A1 * | 1/2015 | Sakawaki | G11B 5/66 |
| | | | 369/13.24 |
| 2015/0170676 A1 | 6/2015 | Hwang et al. | |
| 2015/0221333 A1 | 8/2015 | Hwang et al. | |
| 2015/0255099 A1 | 9/2015 | Brunnett et al. | |
| 2016/0148630 A1 | 5/2016 | Rausch | |
| 2016/0378357 A1 | 12/2016 | Aoki et al. | |
| 2017/0061997 A1 | 3/2017 | Furuhashi | |
| 2017/0076744 A1 | 3/2017 | Takagishi et al. | |
| 2019/0295577 A1 * | 9/2019 | Sudo | G11B 20/1217 |

\* cited by examiner

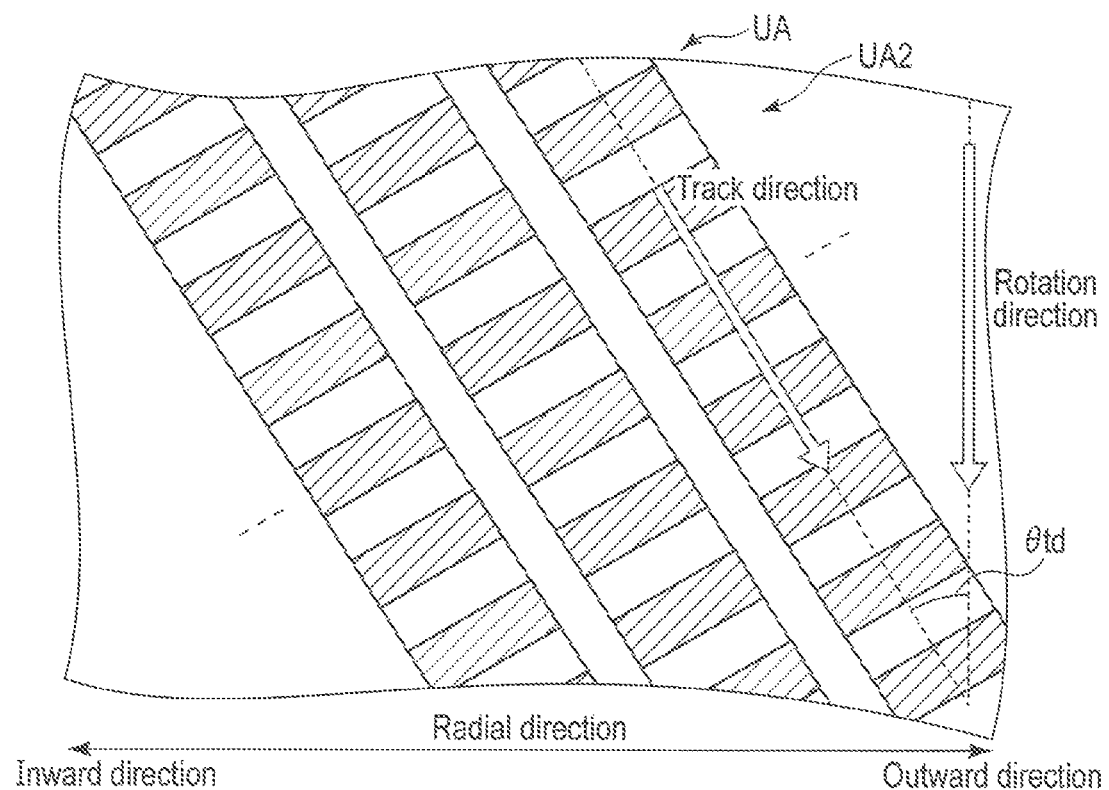
F I G. 7
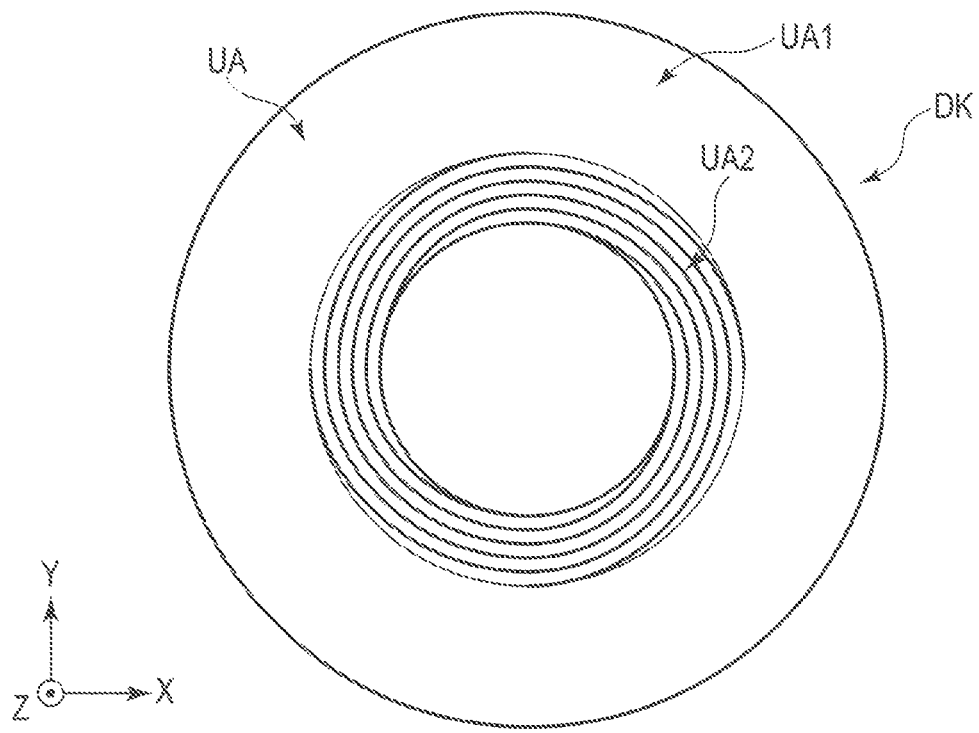
F I G. 8

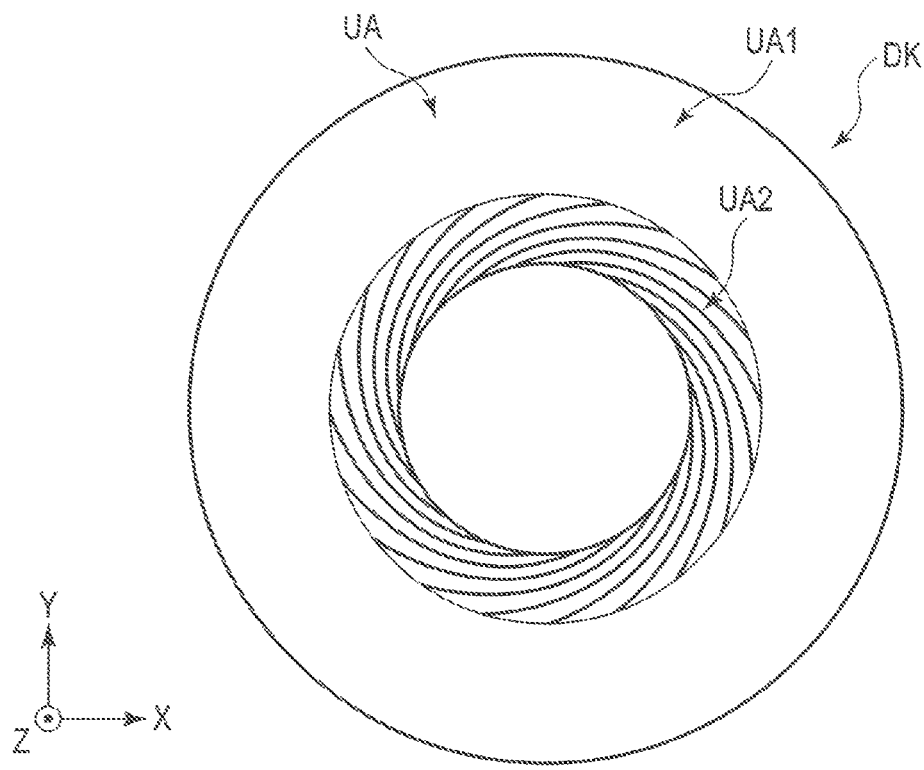
F I G. 9
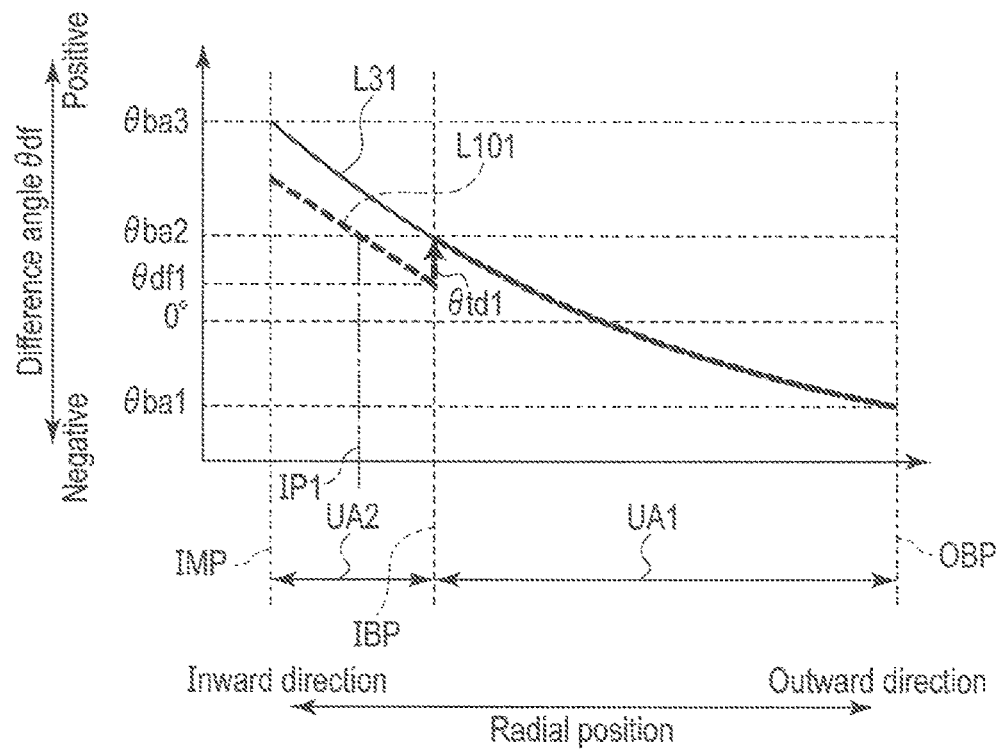
F I G. 10

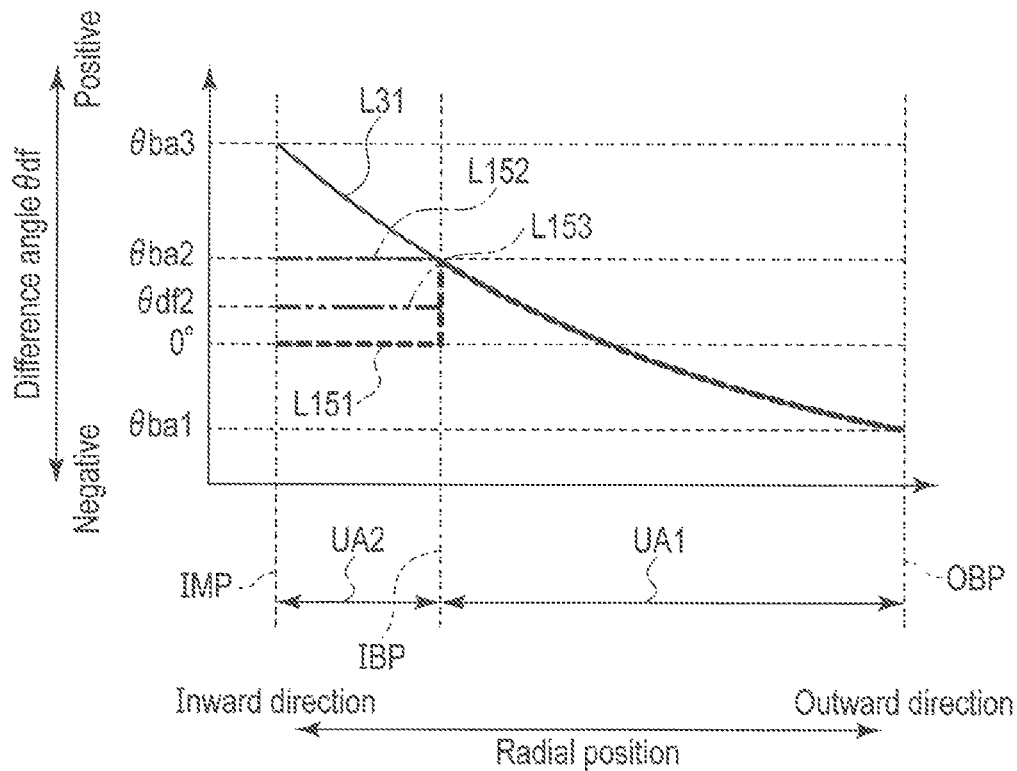
F I G. 15
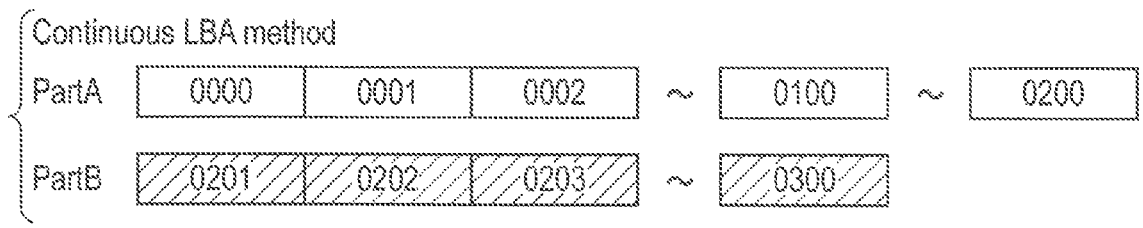
F I G. 16

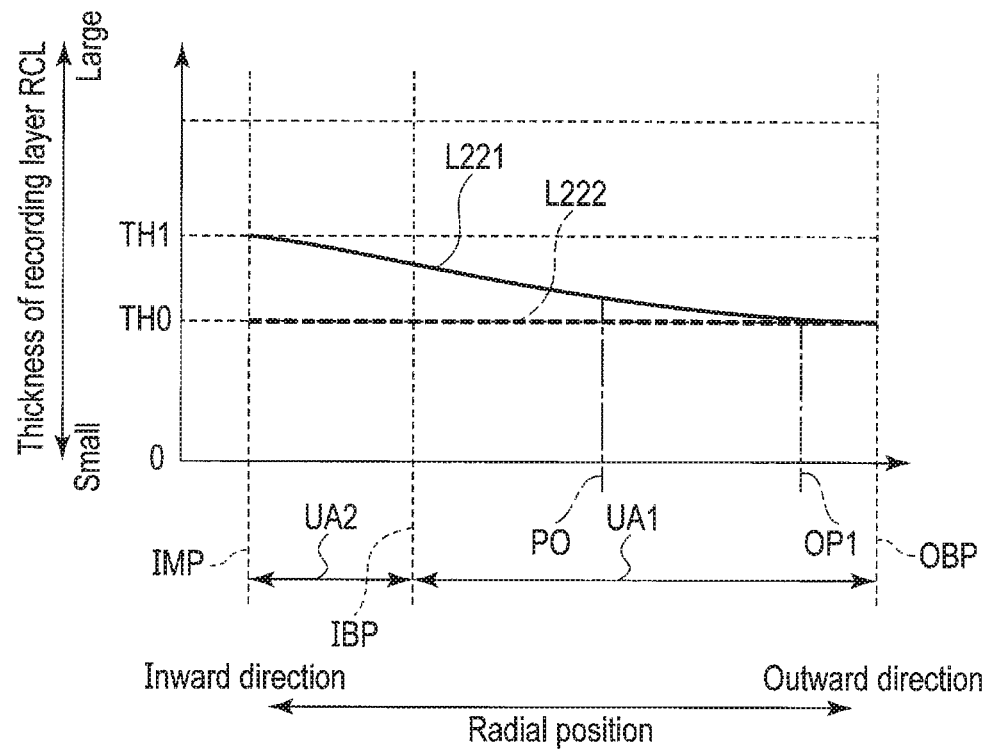
F I G. 22
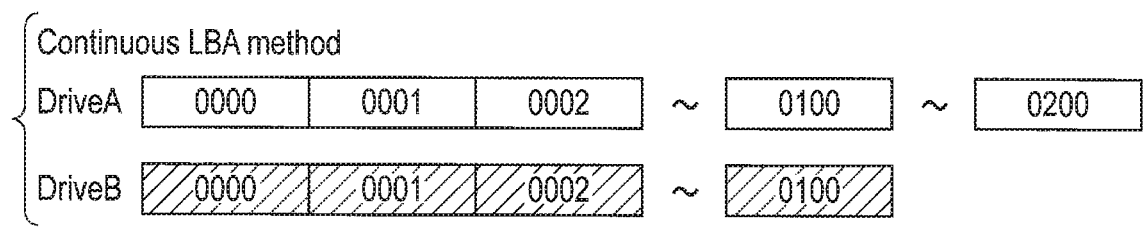
F I G. 24

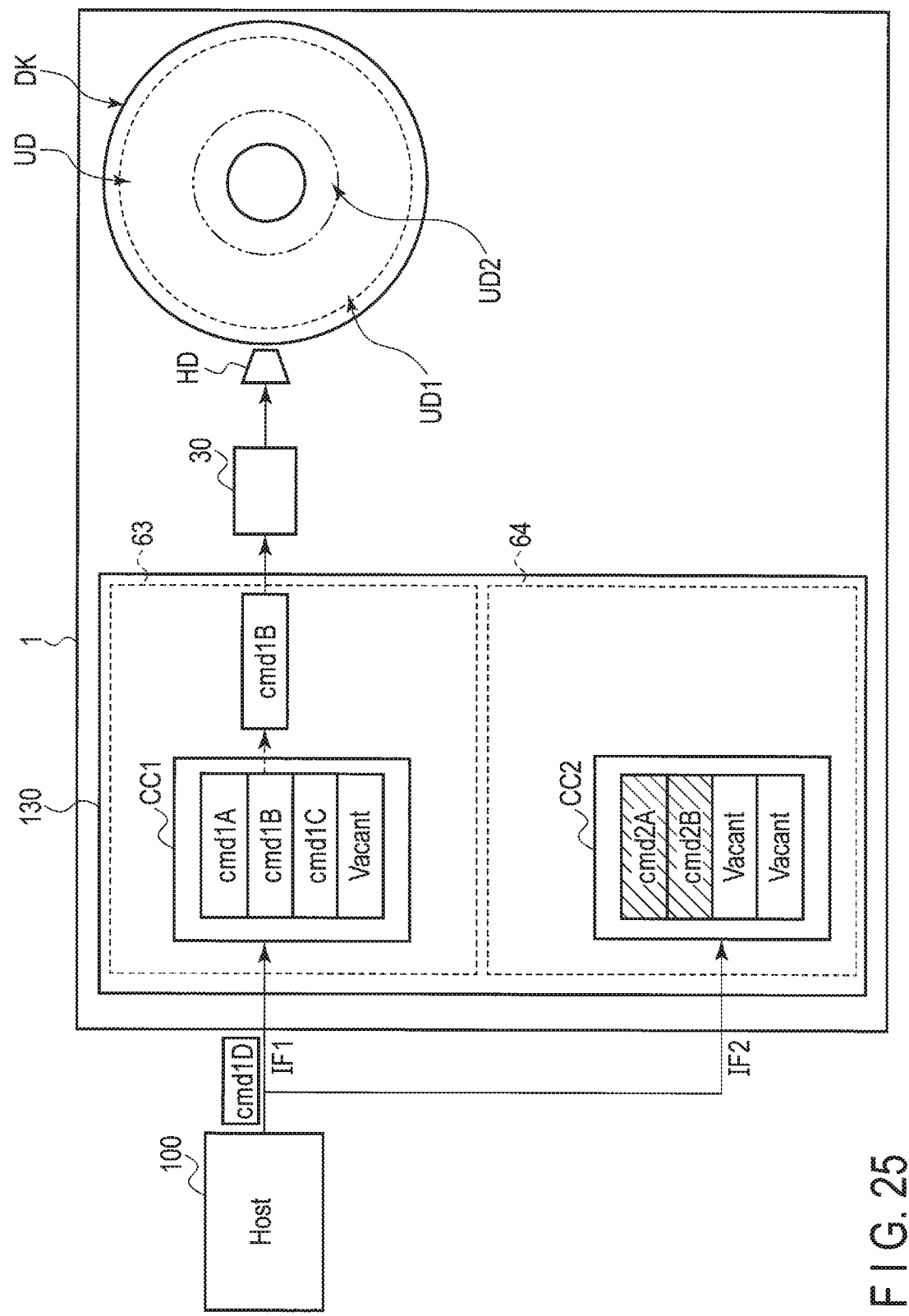
F I G. 25

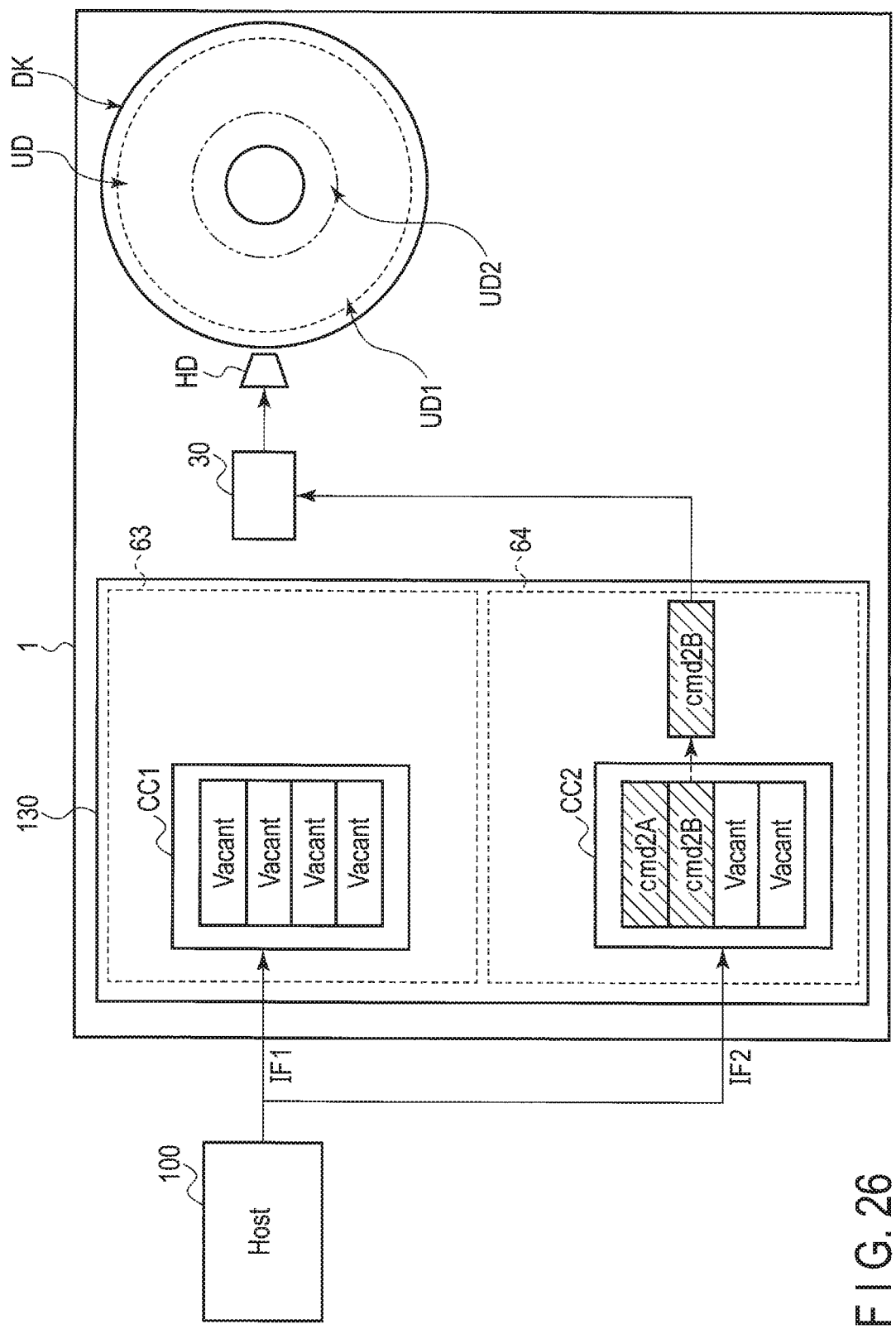
F I G. 26

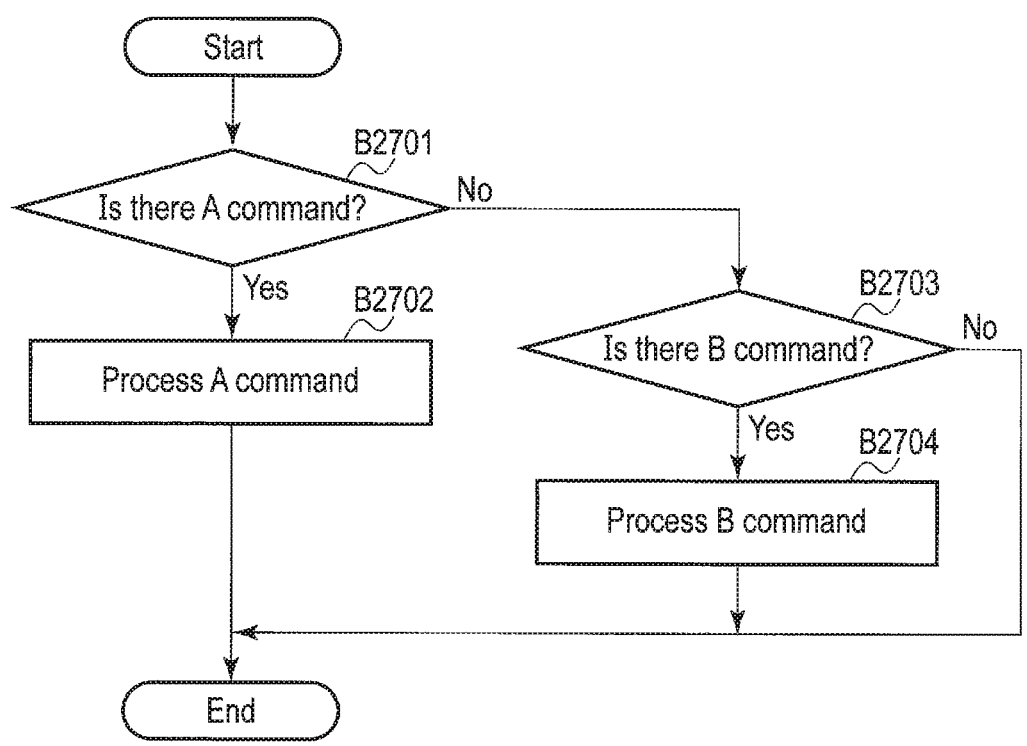
F I G. 27

MAGNETIC DISK DEVICE HAVING TWO REGIONS OF DIFFERENT THICKNESSES

CROSS-REFERENCE TO RELATED APPLICATIONS

This application is a divisional of application Ser. No. 16/111,927 filed Aug. 24, 2018 and is based upon and claims the benefit of priority from Japanese Patent Application No. 2018-055356, filed Mar. 22, 2018, the entire contents of which are incorporated herein by reference.

FIELD

Embodiments described herein relate generally to a magnetic disk device.

BACKGROUND

The magnetic disk device includes an actuator for positioning the head attached to the tip at a target position on the disk. In the magnetic disk device, the skew angle of the head with respect to the circumferential direction of the disk usually changes within a particular angle range. In order to improve the random access performance, a magnetic disk device having an actuator shorter (hereinafter referred to as a short actuator) than a normal actuator is studied. The range of the skew angle of the head by the short actuator is larger than the range of the skew angle of the head by the normal actuator. Therefore, in a magnetic disk device provided with a short actuator, a recording region of a disk is divided into a where the recording quality of data can be ensured and a region where the recording quality of data can not be ensured.

BRIEF DESCRIPTION OF THE DRAWINGS

FIG. 7 is a diagram showing an example of part of tracks arranged in a spiral shape in a second data region;

FIG. 8 is a diagram showing an example of tracks arranged in a spiral shape at a track angle in the second data region;

FIG. 9 is a diagram showing an example of tracks arranged in a spiral shape at a track angle in the second data region;

FIG. 10 is a diagram showing an example of the relation between the radial position and the angle of the head with respect to the track direction in a case where the track is written in a spiral shape at a track angle in the second data region;

FIG. 15 is a diagram showing an example of the relation between the radial position and the difference angle with respect to a track direction in a case where a track is written in a spiral shape at a track angle that changes according to a skew angle in the second data region;

FIG. 16 is a diagram showing an example of an LBA according to the first embodiment;

FIG. 22 is a view showing an example of a change in the thickness of the disk according to the second modification;

FIG. 24 is a diagram showing an example of an LBA according to the second embodiment;

FIG. 25 is a diagram showing an example of command processing according to the second embodiment;

FIG. 26 is a diagram showing an example of command processing according to the second embodiment; and FIG. 27 is a flowchart showing an example of command processing according to the second embodiment.

DETAILED DESCRIPTION

In general, according to one embodiment, a magnetic disk device comprises: a disk including a first region and a second region different from the first region; a head that writes data on the disk and reads data from the disk; an actuator that positions the head on the disk; and a controller which positions the head by driving the actuator and writes data in the first region and the second region with the head, a skew angle of the head with respect to a circumferential direction of the disk varying within a first angle in the first region, and varying, in the second region, from a second angle larger than the first angle to a third angle larger than the first angle and the second angle.

According to another embodiment, a magnetic disk device comprises: a disk including a first region and a second region different from the first region; a head that writes data on the disk and reads data from the disk; and a controller which positions the head by driving the actuator and writes data in the first region and the second region with the head, a thickness of the second region being greater than that of the first region.

According to another embodiment, a magnetic disk device comprises: a disk including a first region and a second region different from the first region; a head that writes data on the disk and reads data from the disk; and a controller which preferentially processes a first command for executing a read/write processing on a first region of the disk over a second command for executing a read/write processing on a second region of the disk.

Hereinafter, embodiments will be described with reference to the drawings. It should be noted that the drawings are merely examples and do not limit the scope of the invention.

First Embodiment

Figure 1:
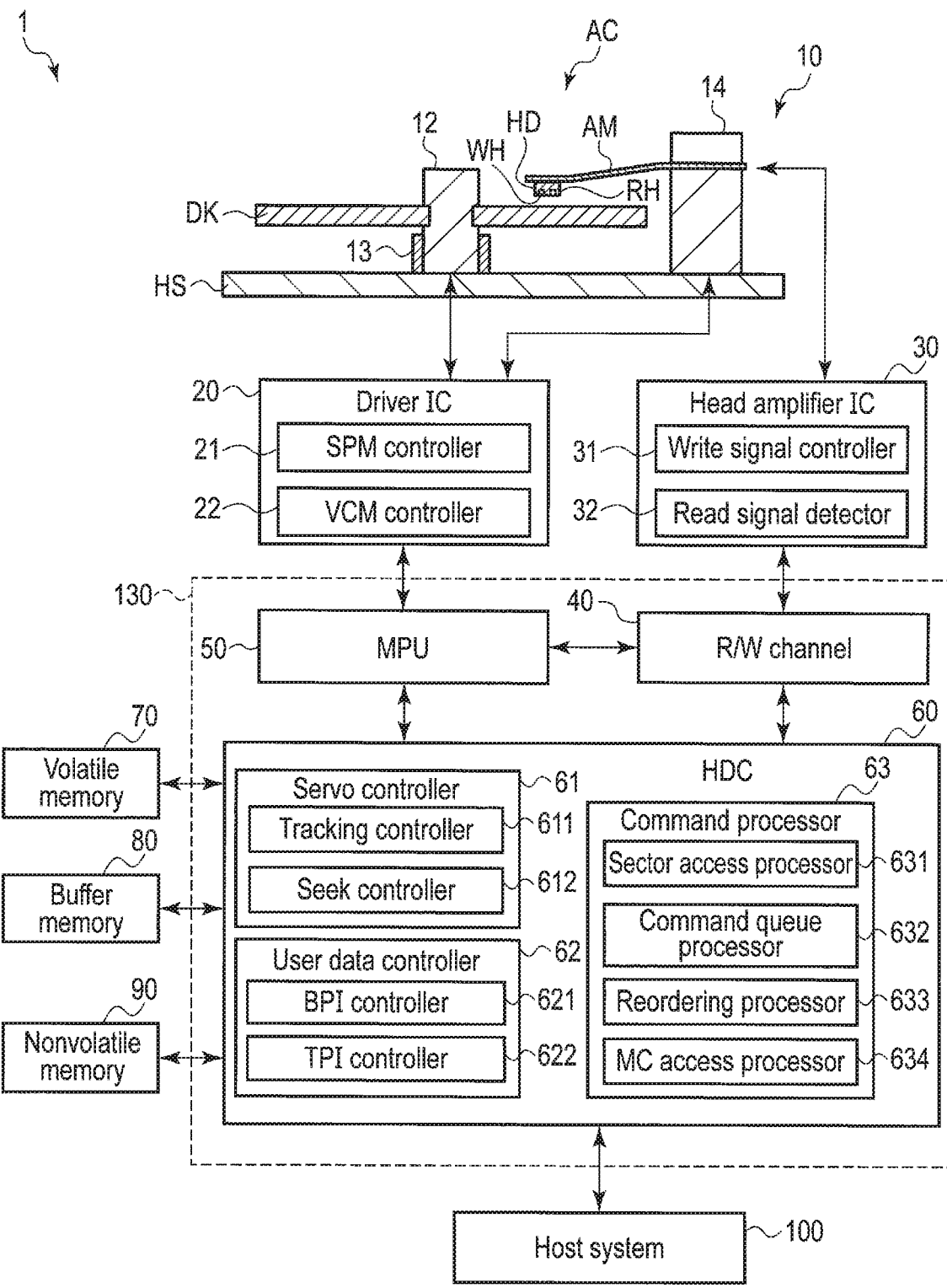
FIG. 1 is a schematic diagram showing an example of the configuration of a magnetic disk device according to a first embodiment.

FIG. 1 is a schematic diagram showing an example of a configuration of a magnetic disk device 1 according to the first embodiment.

The magnetic disk device 1 includes a housing HS, a head disk assembly (HDA) 10, a driver IC 20, a head amplifier integrated circuit (hereinafter referred to as a head amplifier IC or a preamplifier) 30, a volatile memory 70, a buffer memory (Buffer) 80, a nonvolatile memory 90, and a system controller 130 which is an integrated circuit of one chip. Further, the magnetic disk device 1 is connected to a host system (hereinafter simply referred to as a host) 100. FIG. 1 shows a cross section of the HDA 10.

The HDA 10 includes a magnetic disk (hereinafter referred to as a disk) DK, a spindle motor (hereinafter referred to as an SPM) 13 that rotates the disk DK around a spindle 12, an arm AM on which the head HD is mounted, a voice coil motor (hereinafter referred to as a VCM) 14. The SPM 13 and the VCM 14 are fixed to the housing HS. The disk DK is attached to the spindle 12 and rotates by driving the SPM 13. The head HD faces the disk DK. The arm AM and the VCM 14 constitute an actuator AC. The actuator AC rotates about the rotation axis to position the head HD attached to the tip of the arm AM at a particular position of the disk DK. The arm 13 of the actuator AC according to the present embodiment is configured to be shorter than, for example, an arm of a normal actuator. Hereinafter, the actuator AC according to the present embodiment may be referred to as a short actuator AC in some cases. By shortening the arm AM compared with the arm of the normal actuator in this way, the inertia of the actuator AC is reduced, and the head HD can be moved at a high speed. At least two disks DK and at least two heads HD may be provided.

Figure 2:
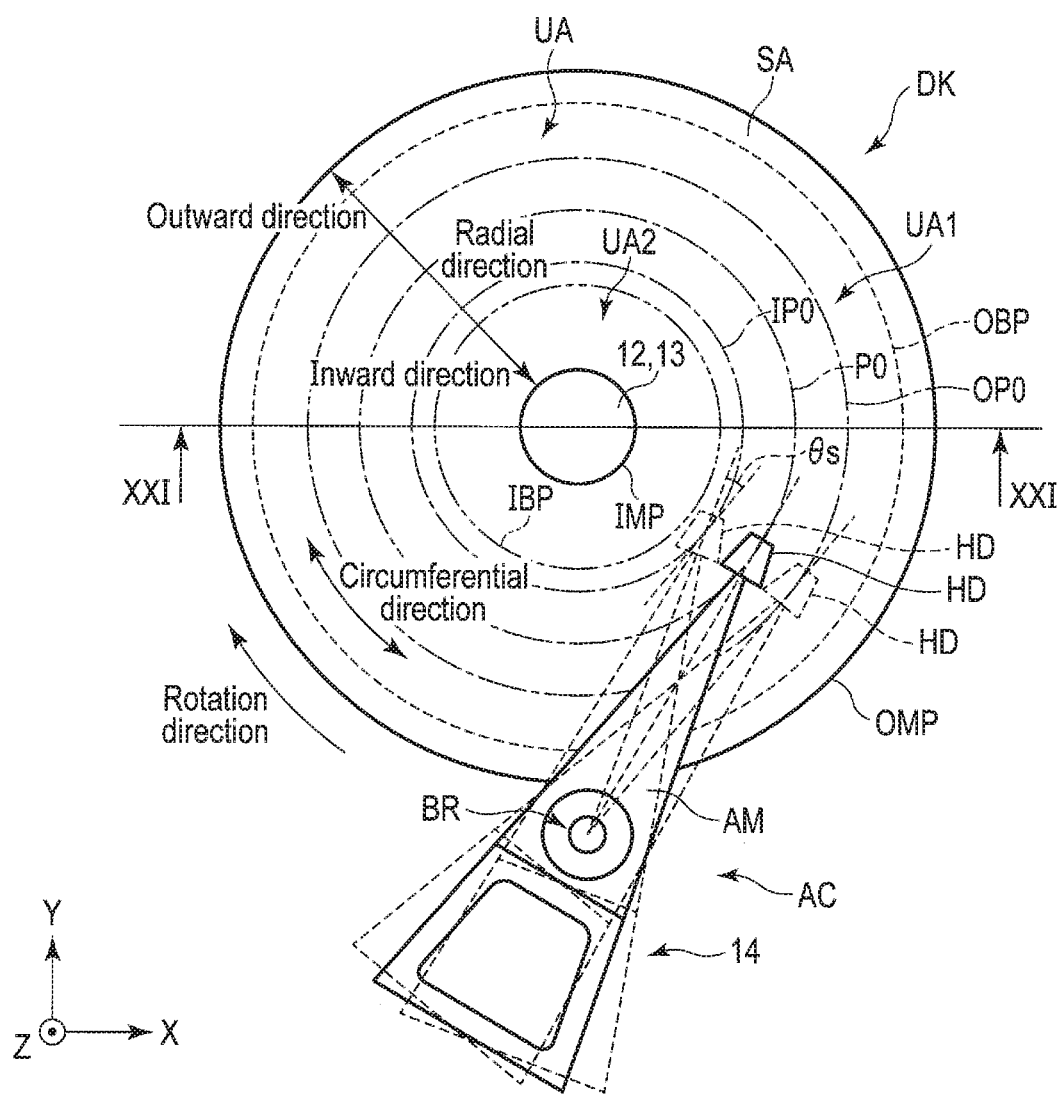
FIG. 2 is a plan view schematically showing an example of a disk.

FIG. 2 is a plan view schematically showing an example of the arrangement of the head HD with respect to the disk DK. The first direction X, the second direction Y, and the third direction Z in the figure are orthogonal to each other. They may intersect in a state other than orthogonal state. The direction toward the tip of the arrow indicating the third direction Z is referred to as upward (or simply up) and the direction opposite from the tip of the arrow indicating the third direction Z is referred to as downward (or simply down). Hereinafter, a direction orthogonal to the radial direction of the disk DK is referred to as a circumferential direction. In the radial direction, the direction toward the spindle 12 is referred to as inward (or the inward direction), and the direction opposite to inward (or the inward direction) is referred to as outward (the outward direction). FIG. 2 shows the rotation direction of the disk DK in the circumferential direction. It should be noted that the rotation direction may be opposite. In addition, FIG. 2 shows an angle (hereinafter referred to as a skew angle, a yaw angle, or an azimuth angle) θ s with respect to the circumferential direction (or rotation direction) of the head HD. The skew angle θ s toward the inward direction is positive and the angle toward the outward direction is negative. The skew angle θ s may be negative when the angle is toward the inward direction and may be positive when the angle is toward the outward direction.

In the disk DK, a user data region UA that can be used by a user in a region in which the data can be written, and a system area SA for writing information necessary for system management (hereinafter referred to as system information) are allocated. In the example shown in FIG. 2, a user data region UA is the region from the radial position IMP (hereinafter referred to as the radial position) of the disk DK to the radial position OBP. The radial position IMP corresponds to the radial position of the innermost periphery of the disk DK. The system area SA is a region from the radial position OMP to the radial position OBP. The radial position OMP corresponds to the radial position of the outermost periphery of the disk DK. The system area SA may not be allocated. The user data region UA is divided into a first data region UA1 and a second data region UA2. The first data region UA1 is a region from the radial position OBP to the radial position IBP. The radial position OBP corresponds to the boundary between the system area SA and the first data region UA1. Data which is available to the user and is accessed with high frequency (hereinafter referred to as high access data) is written in the first data region UA1. The high access data is equivalent to, for example, hot data. The high access data includes, for example, user data (hereinafter also referred to as first user data) and the like. Here, "access" is used as a term including the meaning of "writing data on disk DK" and "reading data from disk DK". In addition, "access frequency" indicates the number of times of access (read/write) within a particular time, that is, the expression of high access frequency or low access frequency. The second data region UA2 is a region from the radial position IBP to the radial position IMP. The radial position IBP corresponds to the boundary between the first data region UA1 and the second data region UA2. In the second data region UA2, which is available to the user, data having a lower priority or a lower access frequency (hereinafter referred to as low access data) than the high access data is written. The low access data is equivalent to, for example, cold data and/or warm data. The low access data includes user data having lower priority or lower access frequency than the first user data (hereinafter also referred to as second user data), system information, media cache (MC) data, and the like.

The head HD with the slider as a main body includes a write head WH and a read head RH mounted on the slider so as to face the disk DK. The write head WH writes data on the disk DK. The read head RH reads the data recorded on the data track on the disk DK. The head HD is positioned, for example, at a particular radial position (hereinafter referred to as a radial position) on the disk DK by the short actuator AC rotating around a bearing BR. In the example shown in FIG. 2, when a write process or a read process is performed in the user data region UA by the short actuator AC, the head HD is positioned at a particular radial position within the region from the radial position OBP to the radial position IMP. As shown in FIG. 2, when positioned at a particular radial position of the disk DK, the head HD is inclined at a particular skew angle θ s with respect to the circumferential direction (rotation direction). In the example shown in FIG. 2, when the head HD is positioned at the radial position PO by the short actuator AC, the skew angle θ s of the head HD is 0°. When the head HD is positioned at the radial position IP0 inward relative to the radial position P0 by the short actuator AC, the skew angle θ s of the head HD is positive. When the head HD is positioned at the radial position OP0 outward relative to the radial position P0 by the short actuator AC, the skew angle θ s of the head HD becomes is negative.

Figure 3:
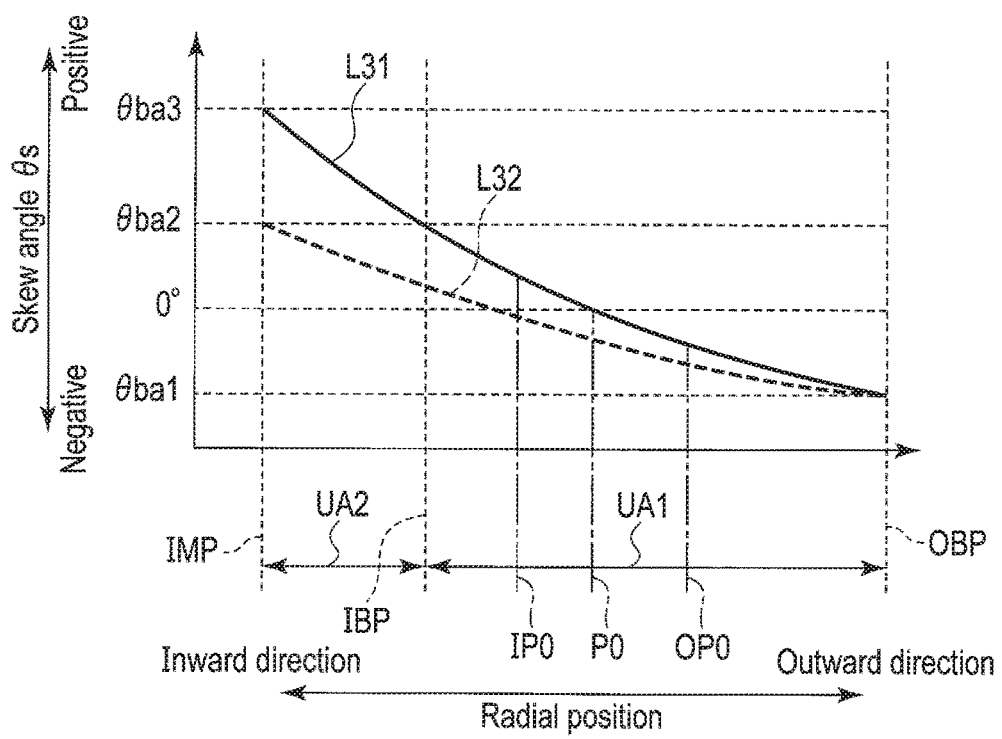
FIG. 3 is a diagram showing an example of the relation between the radial position and the skew angle of the disk.

FIG. 3 is a diagram showing an example of the relation between the radial position of the disk DK and the skew angle θ s. In FIG. 3, the vertical axis represents the skew angle and the horizontal axis represents the radial position. In FIG. 3, the line L31 indicates a change in the skew angle θ s) with respect to the radial position of the disk DK corresponding to the short actuator AC (hereinafter referred to as a change in the skew angle θ s of the short actuator AC. The line L32 indicates a change in the skew angle θ s (hereinafter referred to as a change in the skew angle θ s of a normal actuator) with respect to the radial position of the disk DK corresponding to a normal actuator having an arm longer than the arm AM of the short actuator AC (hereinafter referred to simply as the normal actuator).

In the example shown in FIG. 3, when the head HD is moved from the radial position OBP to the radial position IMP by the short actuator AC as indicated by the change L31 in the skew angle θ s of the short actuator AC, the skew angle θ s of the head HD changes from the first boundary angle θ ba1 corresponding to the radial position OBP to the third boundary angle θ ba3 corresponding to the radial position IMP. For example, the absolute value of the first boundary angle θ ba1 and the absolute value of the second boundary angle θ ba2 are the same. For example, the first boundary angle θ ba1 is −15° and the second boundary angle θ ba2 is 15°. Also, the third boundary angle θ ba3 is larger than the second boundary angle θ ba2. That is, the third boundary angle θ ba3 is larger than the absolute value of the first boundary angle θ ba1. For example, the third boundary angle θ ba3 is 30°.

In the example shown in FIG. 3, when the head HD is moved from the radial position OBP to the radial position IMP by a normal actuator as indicated by the change L32 in the skew angle θ s of the normal actuator, the skew angle θ s of the head HD changes from the first boundary angle θ ba1 corresponding to the radial position OBP to the second boundary angle θ ba2 corresponding to the radial position IMP.

The driver IC20 controls the driving of the SPM 13 and the VCM 14 according to the control of the system controller 130 (more specifically, an MPU 50 described later). The driver IC20 includes an SPM controller 21 and a VCM controller 22. The SPM controller 21 controls the rotation of the SPM 13. The VCM controller 22 controls the driving of the VCM 14 by adjusting the current to be supplied. Note that part of the configuration of the driver IC20 (for example, the SPM controller 21 and the VCM controller 22) may be provided in the system controller 130.

The head amplifier IC (preamplifier) 30 amplifies the read signal read from the disk DK and outputs it to the system controller 130 (more specifically, a read/write (R/W) channel 40 to be described later). Further, the head amplifier IC 30 outputs write current corresponding to a signal output from an R/W channel 40 to the head HD. The head amplifier IC 30 includes a write signal controller 31 and a read signal detection unit 32. The write signal controller 31 adjusts the write current output to the head HD under the control of the system controller 130 (more specifically, the MPU 50 described later). The read signal detection unit 32 detects a signal to be written by a write head and a signal read by a read head. Note that part of the configuration of the head amplifier IC 30 (for example, the write signal controller 31 and the read signal detection unit 32) may be provided in the system controller 130.

The volatile memory 70 is a semiconductor memory from which stored data is lost when power supply is cut off. The volatile memory 70 stores data and the like necessary for processing in each part of the magnetic disk device 1. The volatile memory 70 is, for example, a DRAM (Dynamic Random Access Memory) or an SDRAM (Synchronous Dynamic Random Access Memory).

The buffer memory 80 is a semiconductor memory that temporarily records data and the like transmitted and received between the magnetic disk device 1 and a host 100. It is to be noted that the buffer memory 80 may be formed integrally with the volatile memory 70. The buffer memory 80 is, for example, a DRAM, an SRAM (Static Random Access Memory), an SDRAM, an FeRAM (Ferroelectric Random Access Memory), an MRAM (Magnetoresistive Random Access Memory), or the like.

The nonvolatile memory 90 is a semiconductor memory that records data stored even when power supply is cut off. The nonvolatile memory 90 is, for example, a NOR type or NAND type flash ROM (Flash Read Only Memory (FROM)).

The system controller (controller) 130 is implemented by using a large scale integrated circuit (LSI) referred to as the System-on-a-Chip (SoC) in which a plurality of elements are integrated on a single chip, for example. The system controller 130 includes the read/write (R/W) channel 40, a microprocessor (MPU) 50, and a hard disk controller (HDC) 60. The system controller 130 is electrically connected to the driver IC20, the head amplifier IC 30, the volatile memory 70, the buffer memory 80, the nonvolatile memory 90, and the host system 100. It should be noted that the system controller 130 may include the SPM controller 21, the VCM controller 22, the write signal controller 31, and the read signal detection unit 32. Further, the system controller 130 may include the driver IC20 and the head amplifier IC 30.

The R/W channel 40 executes signal processing of read data transferred from the disk DK to the host 100 and write data transferred from the host 100 in response to an instruction from the MPU 50 to be described later. The R/W channel 40 has a circuit or a function for measuring a signal quality of read data. The R/W channel 40 is electrically connected to the head amplifier IC 30, the MPU50, an HDC 60, and the like, for example.

The MPU 50 is a main controller that controls each part of the magnetic disk device 1 in response to an instruction from the host 100 or the like. The MPU 50 controls the actuator AC via the driver IC20 and executes servo control for positioning the head HD. The MPU 50 controls a write operation of the data to the disk DK and selects the save destination of the write data. In addition, the MPU 50 controls a read operation of the data from the disk DK and controls the processing of the read data. The MPU 50 is connected to each part of the magnetic disk device 1. The MPU 50 is electrically connected to the driver IC20, the R/W channel 40, the HDC 60, and the like, for example.

The MPU 50 divides the disk DK into the first data region UA1 in which the skew angle θ s of the head HD changes from the first boundary angle θ ba1 to the second boundary angle θ ba2 by driving of the actuator AC, and the second region UA2 in which the skew angle changes from the second boundary angle θ ba2 to the third boundary angle θ ba3 by driving the actuator AC. When the absolute value of the first boundary angle θ ba1 is equal to the absolute value of the second boundary angle θ ba2, the MPU 50 divides the disk DK into the first data region UA1 in which the skew angle θ s of the head HD of the disk DK changes within an absolute value of the first boundary angle θ ba1 by driving the actuator AC, and the second region UA2 in which the skew angle changes from the absolute value of the first boundary angle θ ba1 to the third boundary angle θ ba3 due to the driving of the actuator AC.

The MPU 50 writes the user data, the media cache data, the system information, and the like in the second data region UA2. For example, in order to maintain high random access performance, the MPU 50 performs control so that the head HD moves between the first data region UA1 and the second data region UA2 less frequently.

When writing user data in the second data region UA2, the MPU 50 writes the high access data (hot data) having a high access frequency in the first data region UA1 and writes the low access data (cold data and/or warm data) with a low access frequency in the second data region UA2. The MPU 50, for example, at a timing when the queue of a command queue processor 632 to be described later is vacant and there is a margin for accessing the disk DK, moves data (cold data and/or warm data) with a low access frequency in the first data region UA1 to the second data region UA2.

When using the second data region UA2 as a media cache, the MPU 50 writes the data primarily and sequentially in the first data region UA1 after accessing the second data region UA2. Therefore, the head HD moves back and forth between the first data region UA1 and the second data region UA2 with a low access frequency, so that the status indicating the completion of writing the user data can be returned to the host 100 at an earlier timing. For example, the MPU 50 writes data (cached) written in the second data region UA2 to the first data region UA1 at a timing when the queue of the command queue processor 632 to be described later is vacant and there is a margin for accessing the disk DK.

When using the second data region UA2 as the system area, the MPU 50 writes the system information in the special area in the manufacturing process. For example, when starting the magnetic disk device 1, the MPU 50 accesses the system area of the second data region UA2 to read the system information. In this case, since the timing of accessing the second data region UA2 is only the timing such as when the magnetic disk device 1 is activated or initialized (re-zero), the head HD moves back and forth between the first data region UA1 and the second data region UA2 with a low access frequency, so that it is possible to write many system information on the disk DK.

In accordance with an instruction from the MPU 50, the HDC 60 controls read/write processing, and controls data transfer between the host 100 and the R/W channel 40. The HDC 60 is electrically connected to, for example, the R/W channel 40, the MPU 50, the volatile memory 70, the buffer memory 80, the nonvolatile memory 90, and the like.

The HDC 60 includes a servo controller 61, a user data controller 62, and a command processor 63. The HDC 60 executes the processes of these units, for example, the servo controller 61, the user data controller 62, the command processor 63 and the like on the firmware. It should be noted that the HDC 60 may include these units as circuits. Part of the configuration of the HDC 60 may be provided in the MPU 50. For example, the servo controller 61, the user data controller 62, and the command processor 63 may be provided in the MPU 50. Further, the HDC 60 may include the configuration and functions of the MPU 50.

The servo controller 61 controls the positioning of the head HD to a particular position on the disk DK. The servo controller 61 includes a tracking controller 611 and a seek controller 612.

The tracking controller 611 controls the head HD so as to follow a particular position of the disk DK, for example, a particular track through the read/write processing.

The seek controller 612 controls movement (seek) of the head HD on the disk DK.

The user data controller 62 controls the arrangement of data on the disk DK. Hereinafter, "arranging data (track)" may be used in the same meaning as "writing data (track)". For example, the user data controller 62 controls the head HD via the servo controller 61, and controls the arrangement of data according to the radial position. The user data controller 62 includes, for example, a BPI (Bit Per Inch) control unit 621 and a TPI (Tracks Per Inch) control unit 622. A BPI controller 621 controls the BPI (linear recording density) according to the radial position of the disk DK. A TPI controller 622 controls the TPI (track density) according to the radial direction region of the disk DK, for example, the zone.

Figure 4:
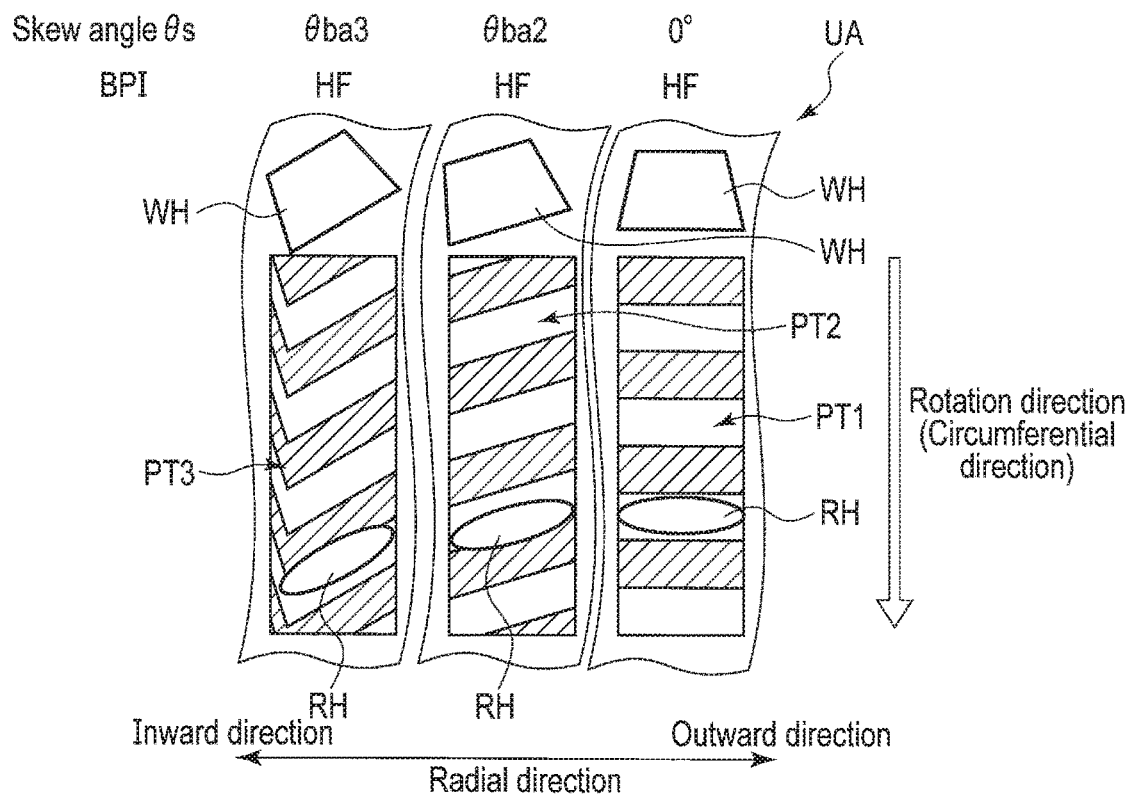
FIG. 4 is a diagram showing an example of a magnetization pattern written on the disk with each skew angle.
Figure 5:
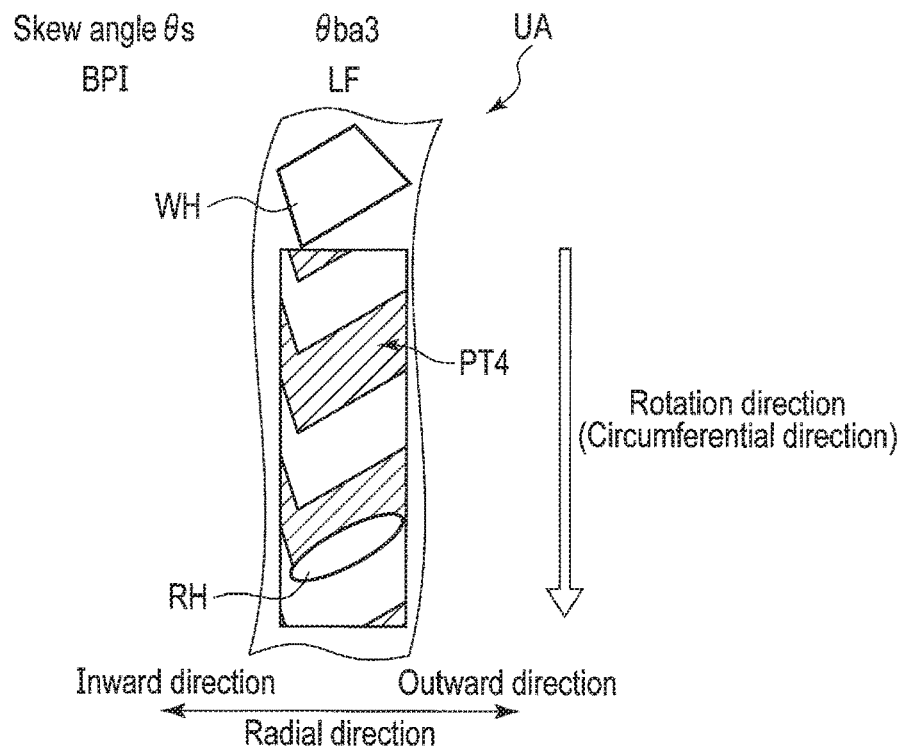
FIG. 5 is a diagram showing an example of a magnetization pattern written on the disk with each skew angle.

FIGS. 4 and 5 are diagrams showing an example of a magnetization pattern written on the disk DK at each skew angle θ s.

The user data controller 62 positions the head HD at a particular radial position of the disk DK and writes the data on the disk DK with a particular BPI by the write head WH. In the example shown in FIG. 4, the user data controller 62 positions the head HD at the radial position P0 at which the skew angle θ s is zero, and writes data (or track) having the data pattern PT1 on the disk DK by the write head WH based on the high frequency (HF) write signal. In the data pattern PT1, a magnetization pattern substantially perpendicular to the circumferential direction (rotation direction) is repeated. The user data controller 62 positions the head HD at the radial position IBP at which the skew angle θ s becomes the second boundary angle θ ba2, and writes data having the data pattern PT2 on the disk DK by the write head WH based on the high frequency (HF) write signal. In the data pattern PT2, a magnetization pattern inclined according to the write head WH with respect to the circumferential direction is repeated. The user data controller 62 positions the head HD at the radial position IMP at which the skew angle θ s becomes the third boundary angle θ ba3, and writes data having the data pattern PT3 on the disk DK by the write head WH based on the high frequency (HF) write signal. In the data pattern PT3, a magnetization pattern inclined according to the write head WH with respect to the circumferential direction is repeated. When the skew angle θ s is the third boundary angle θ ba3, since the bevel angle of the rear end portion of the write head WH in the rotation direction is positioned within the data width with respect to the circumferential direction, the data pattern PT3 has a disturbed magnetization pattern in the radially inward direction.

In the example shown in FIG. 5, the user data controller 62 positions the head HD at the radial position IMP at which the skew angle θ s becomes the third boundary angle θ ba3, and writes data having the data pattern PT4 on the disk DK by the write head WH based on the low frequency (LF) write signal. In the data pattern PT4, a magnetization pattern inclined according to the write head WH with respect to the circumferential direction is repeated. Also in this case, the magnetization pattern of the data pattern PT4 is disturbed in the radially inward direction. In addition, the width of the magnetization pattern of the data pattern PT4 in the circumferential direction is larger than that of the data pattern PT3.

For example, when reading the data patterns PT3 and PT4 in which the magnetization patterns are disturbed as shown in FIGS. 4 and 5, the signal quality of the read data, for example, SNR (Signal to noise ratio) deteriorates, compared with the case of reading the data patterns PT1 and PT2. The phenomenon in which the signal quality of data deteriorates when reading data written by the head HD with the skew angle θ s larger than the particular angle is also referred to as azimuth loss. From the examples shown in FIGS. 4 and 5, when data is written by the head HD with the skew angle θ s larger than the second boundary angle θ ba2, the magnetization pattern of the data pattern is disturbed, and azimuth loss may occur. In other words, when the head HD is inclined at an angle larger than the second boundary angle θ ba2 with respect to the direction in which the track extends (hereinafter simply referred to as the track direction), the magnetization pattern of the data pattern is disturbed, and azimuth loss may occur. That is, when the head HD is inclined at or below the absolute value of the second boundary angle θ ba2 with respect to the track direction, the magnetization pattern of the data pattern is not disturbed, so that azimuth loss does not occur. Therefore, when reading the data pattern written by the head HD inclined at or below the absolute value of the second boundary angle θ ba2, the signal quality of the read data can be ensured. Hereinafter, the second boundary angle θ ba2 may be referred to as an angle θ th that ensures the signal quality of the read/write processing. Further, when the head HD is inclined at an angle larger than the second boundary angle θ ba2 with respect to the track direction, the user data controller 62 can also improve the signal quality by lowering the BPI (linear recording density). In other words, the user data controller 62 can lower the BPI (linear recording density) in the second data region UA2 further than that in the first data region UA1. Further, in order to suppress deterioration of signal quality due to interference by radially adjacent tracks (hereinafter simply referred to as adjacent tracks), the user data controller 62 can lower TPI (track density), thereby improving the signal quality. In other words, the user data controller 62 can lower TPI (track density) in the second data region UA2 further than that in the first data region UA1.

The user data controller 62 controls the direction (track direction) in which data is arranged. For example, when writing data within the range from the first boundary angle θ ba1 to the second boundary angle θ ba2 with respect to the skew angle θ s, that is, when writing data to the first data region UA1, the user data controller 62 arranges the data (track) in a circular shape. When writing data within the range from the second boundary angle θ ba2 to the third boundary angle θ ba3 with respect to the skew angle θ s, that is, when writing data to the second data region UA2, the user data controller 62 arranges the data (track) in a spiral shape.

Figure 6:
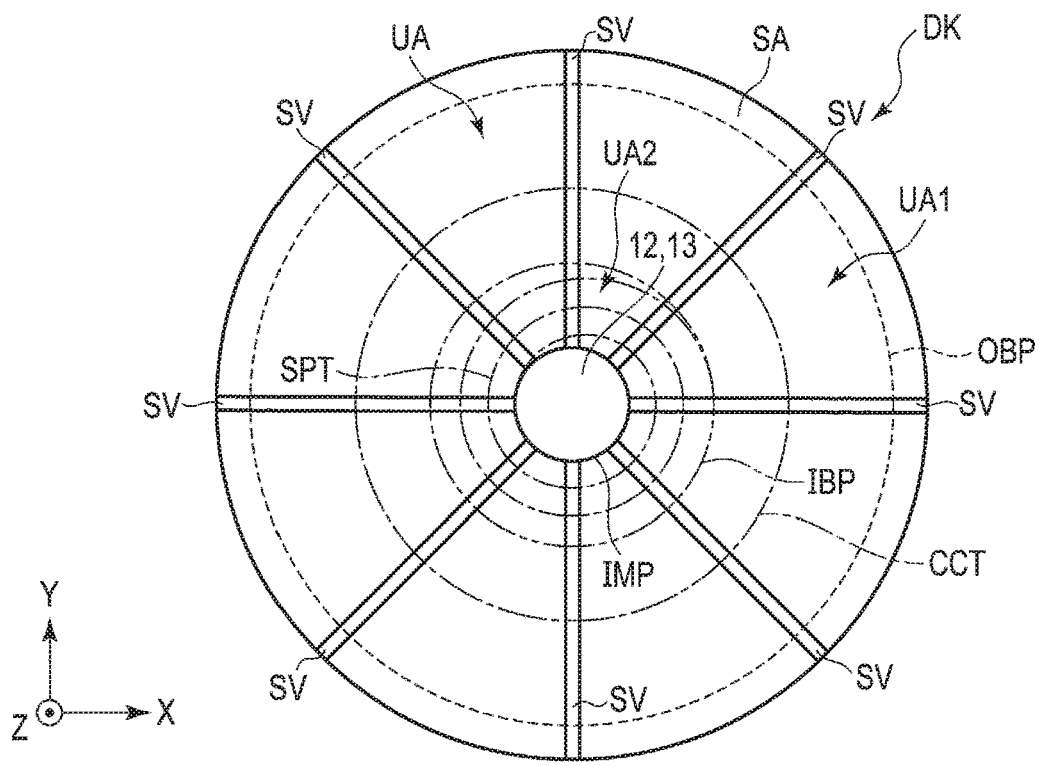
FIG. 6 is a diagram showing an example of tracks in each region of the disk.

FIG. 6 is a diagram showing an example of tracks in each region of the disk DK. FIG. 6 shows a plurality of servo regions SV. Hereinafter, the servo region SV may be referred to as a servo sector in some cases. The plurality of servo regions SV radially extends in the radial direction of the disk DK and are discretely arranged with a particular interval in the circumferential direction. In FIG. 6, the servo regions SV radially extend from the first data region UA1 to the second data region UA2 in the radial direction.

In the example shown in FIG. 6, the user data controller 62 arranges the track CCT in a circular shape in the first data region UA1. Further, the user data controller 62 arranges the track SPT in a spiral shape in the second data region UA2. The user data controller 62 may arrange tracks in a spiral shape from the radial position IMP toward the radial position IBP or arrange tracks in a spiral shape from the radial position IBP toward the radial position IMP. It should be noted that tracks arranged in a spiral shape may be a single spiral or a multi spiral.

FIG. 7 is a diagram showing an example of part of tracks arranged in a spiral shape in the second data region UA2. In FIG. 7, the inclination θ td of the track direction with respect to the circumferential direction (hereinafter referred to as track angle) is shown.

In the example shown in FIG. 7, the user data controller 62 arranges tracks in the second data region UA2 at the track angle θ td with respect to the circumferential direction.

FIG. 8 is a diagram showing an example of tracks arranged in a spiral shape at the track angle θ td in the second data region UA2.

In the example shown in FIG. 8, the user data controller 62 arranges four tracks in a spiral shape in the second data region UA2 with a track angle θ td of 3°.

FIG. 9 is a view showing an example of tracks arranged in a spiral shape at the track angle θ td in the second data region UA2.

In the example shown in FIG. 9, the user data controller 62 arranges 20 tracks in a spiral shape in the second data region UA2 with a track angle θ td of 10°.

FIG. 10 is a diagram showing an example of the relation between the radial position in a case where a track is written in a spiral shape at the track angle θ td in the second data region UA2 and the angle θ df of the head HD with respect to the track direction. In FIG. 10, the vertical axis represents the angle of the head HD with respect to the track direction (hereinafter referred to as difference angle) θ df, and the horizontal axis represents the radial position. The difference angle θ df corresponds to the difference value (θ s−θ td) between the skew angle θ s and the track angle θ td. In FIG. 10, the line L31 shows a change in the difference angle θ df with respect to the radial position (hereinafter referred to as a change in the difference angle θ df with respect to the circular track) in a case where each track is arranged concentrically with the center of the disk DK. The change L31 in the difference angle θ df with respect to the circular track corresponds to the change L31 in the skew angle θ s of the short actuator AC shown in FIG. 3. The line L101 shows a change in the difference angle θ df with respect to the radial position (hereinafter referred to as a change in the difference angle θ df with respect to the track with the track angle θ td) in a case where tracks are arranged in a spiral shape at the track angle θ td in the second data region UA2.

In the example shown in FIG. 10, as indicated by the change L101 in the difference angle θ df with respect to the track with the track angle θ td, the user data controller 62 arranges the track in a spiral shape at the track angle θ td of θ td1, for example, 10° in the second data region UA2. In this case, the difference angle θ df is a difference angle θ df1 smaller than the second boundary angle θ ba2 at the radial position IBP. In other words, the head HD is inclined at the difference angle θ df1 smaller than the second boundary angle θ ba2 with respect to the track direction at the radial position IBP. The difference angle θ df increases toward the radial position IMP from the radial position IBP, and becomes larger than the second boundary angle θ ba2 at the radial position IP1. That is, a data pattern in which the magnetization pattern is disturbed by the head HD inward relative to the radial position IP1 can be written. Compared with the change L31 in the difference angle θ df with respect to the circular track, in the change L101 in the difference angle θ df with respect to the track with the track angle θ td, the region in the radial direction in which the data pattern in which the magnetization pattern is disturbed by the head HD can be written is reduced. That is, compared with the case of reading tracks arranged in a circle in the second data region UA2, when tracks arranged in a spiral shape at the track angle θ td is read, the signal quality of the read data, for example, SNR (Signal to noise ratio) can be improved.

Figure 11:
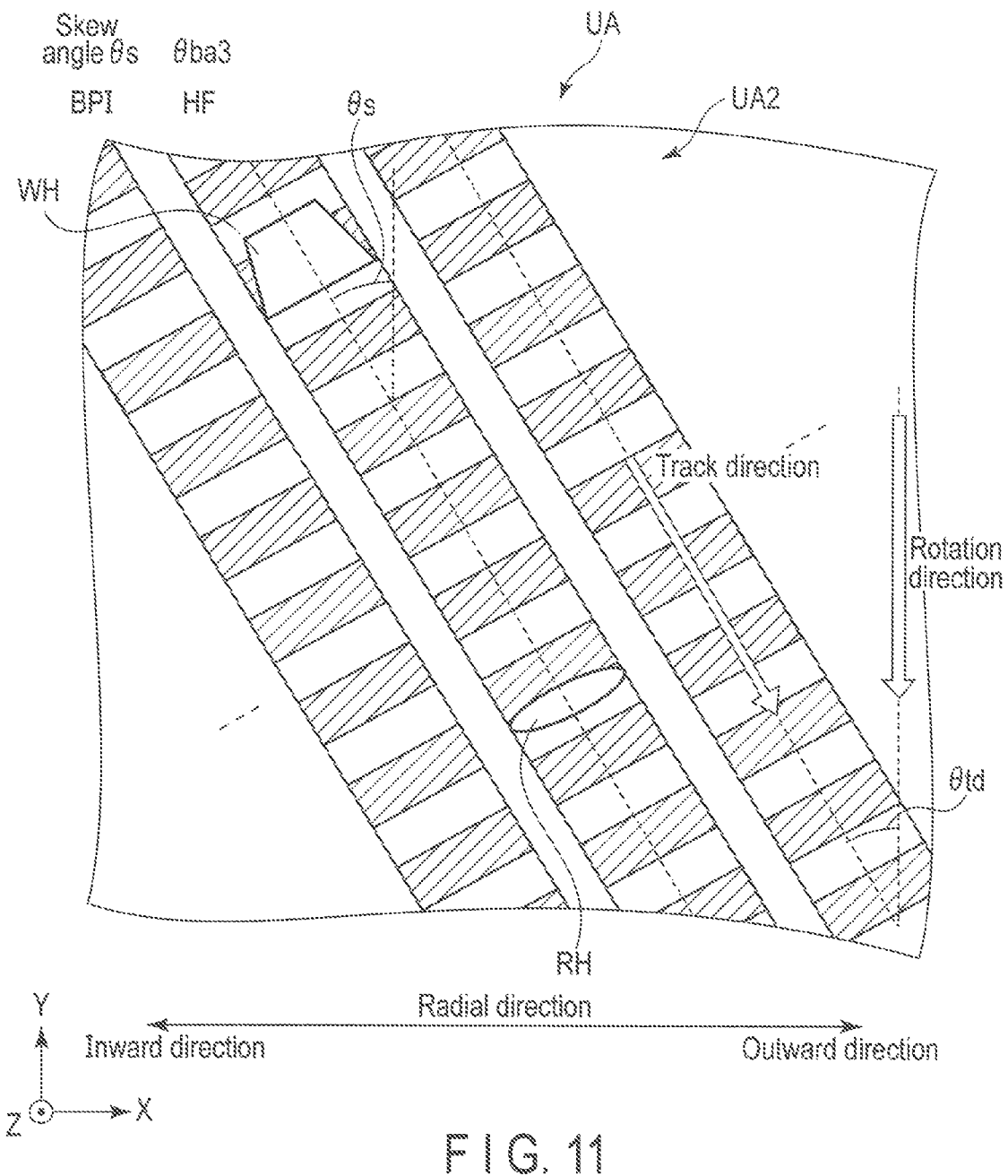
FIG. 11 is a diagram showing an example of part of tracks arranged at a track angle that changes according to the skew angle in the second data region.

FIG. 11 is a diagram showing an example of part of tracks arranged at a track angle θ td that changes according to the skew angle θ s in the second data region UA2.

In the example shown in FIG. 11, the user data controller 62, in the second data region UA2, arranges tracks at the track angle θ td which changes according to the skew angle θ s by the write head WH based on the high frequency (HF) write signal, for example, at θ td=θ ba3 (=θ s).

Figure 12:
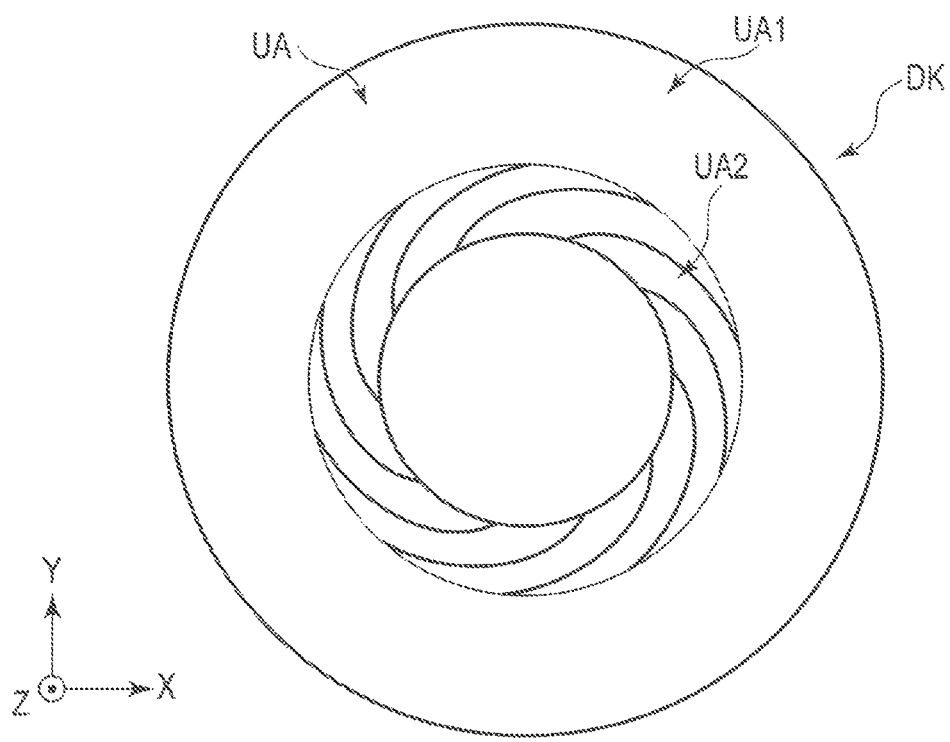
FIG. 12 is a view showing an example of tracks arranged in a spiral shape at a track angle which changes according to the skew angle in the second data region.

FIG. 12 is a view showing an example of tracks arranged in a spiral shape at the track angle θ td changing according to the skew angle θ s in the second data region UA2.

In the example shown in FIG. 12, the user data controller 62, in the second data region UA2, arranges ten tracks in a spiral shape at the track angle θ td which changes according to the skew angle θ s, for example, at the track angle θ td which changes so that the difference angle θ df becomes 0°.

Figure 13:
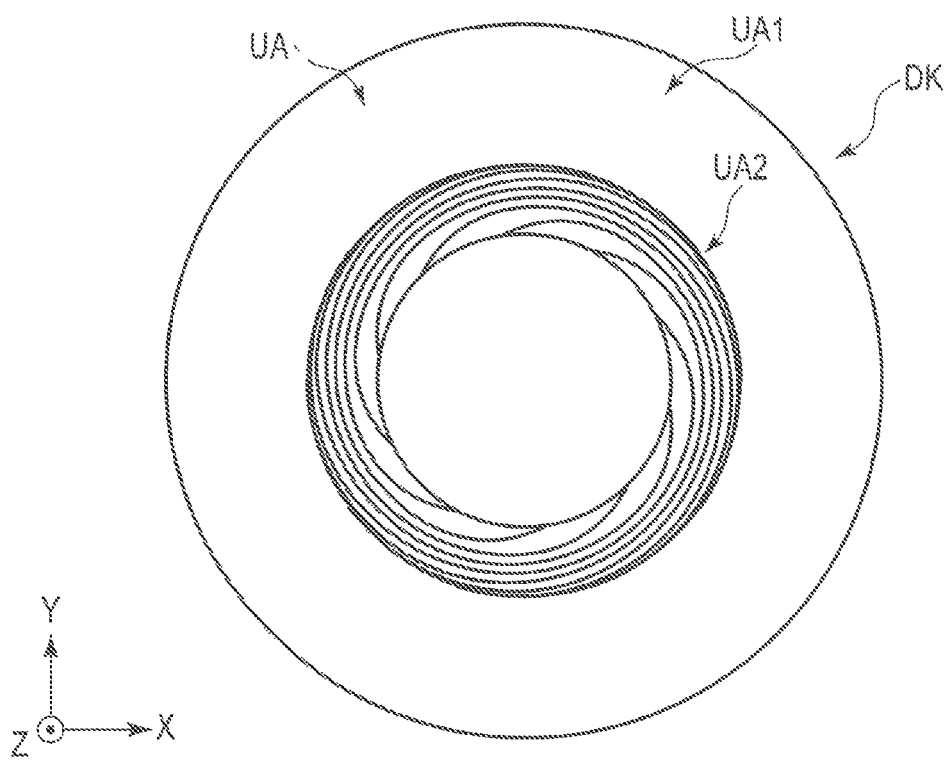
FIG. 13 is a diagram showing an example of tracks arranged in a spiral shape at a track angle θ td changing according to the skew angle in the second data region.

FIG. 13 is a view showing an example of tracks arranged in a spiral shape at the track angle θ td changing according to the skew angle θ s in the second data region UA2.

In the example shown in FIG. 13, the user data controller 62, in the second data region UA2, arranges ten tracks in a spiral shape at the track angle θ td which changes according to the skew angle θ s, for example, at the track angle θ td which changes so that the difference angle θ df becomes the second boundary angle θ ba2.

Figure 14:
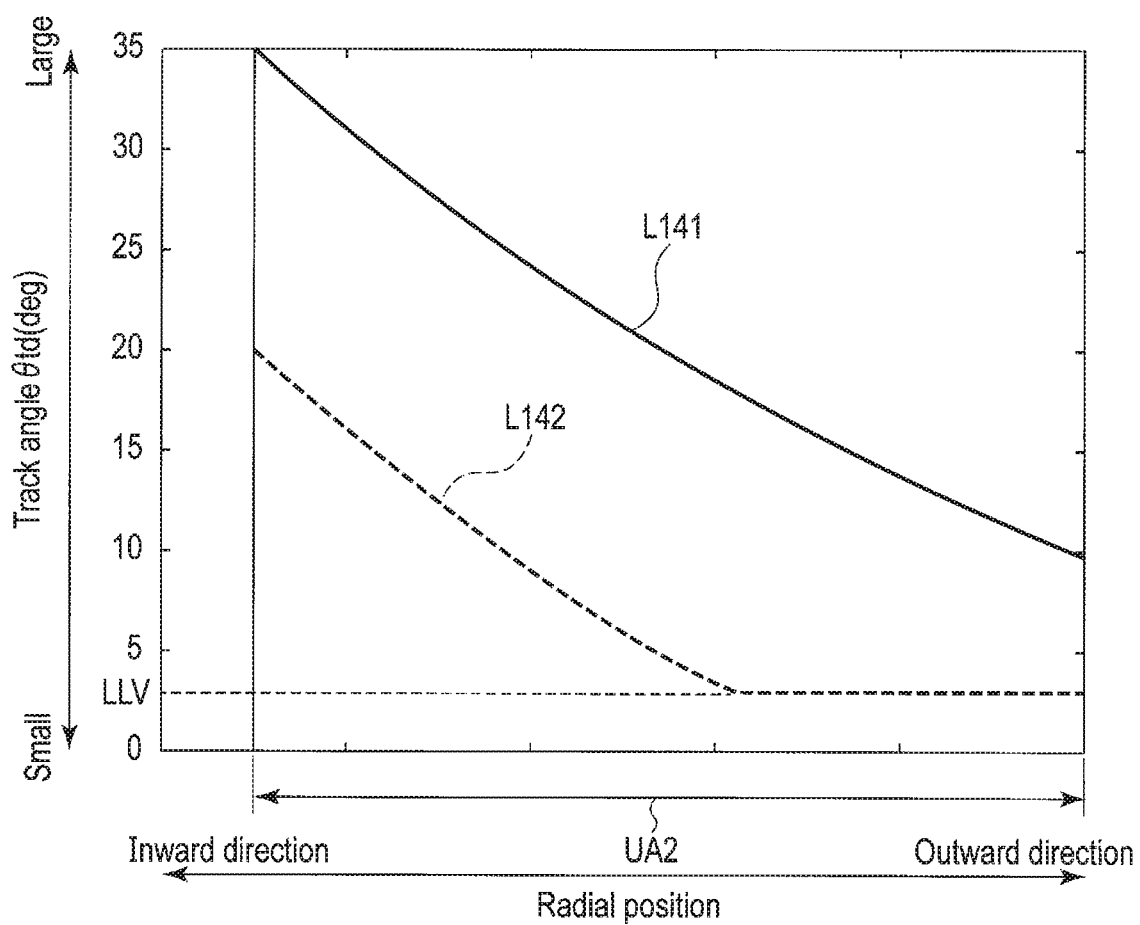
FIG. 14 is a view showing an example of a track angle that changes according to the skew angle.

FIG. 14 is a diagram showing an example of the track angle θ td changing according to the skew angle θ s. In FIG. 14, the vertical axis indicates the track angle θ td and the horizontal axis indicates the radial position in the second data region UA2. The line L141 shows an example of a change in the track angle θ td that changes so that the difference angle θ df shown in FIG. 12 becomes 0°. The line L142 shows an example of a change in the track angle θ td that changes so that the difference angle θ df shown in FIG. 13 becomes a particular angle. Here, the particular angle is, for example, an angle equal to or greater than the second boundary angle θ ba2.

In the second data region UA2, when the skew angle θ s is equal to or less than a particular angle, when the track angle θ td is changed so that the difference angle θ df is the particular angle, the track goes outward or has a circular shape. It does not have a spiral shape heading inward. Therefore, in the second data region UA2, the user data controller 62 performs control so that the track angle θ td is greater than the lower limit value LLV. The lower limit value LLV is, for example, an angle at which the track turns inward when the track angle θ td is changed so that the difference angle θ df becomes a particular angle in the second data region UA2.

FIG. 15 is a diagram showing an example of the relation between the radial position and the difference angle θ df with respect to the track direction in a case where the track is written in a spiral shape at the track angle θ td changing according to the skew angle in the second data region UA2. In FIG. 15, the vertical axis represents the difference angle θ df, and the horizontal axis represents the radial position. FIG. 15 shows the change L31 in the difference angle θ df with respect to the circular track. The line L151 indicates a change in the difference angle θ df with respect to the radial position (hereinafter referred to as change in as a first difference angle θ df) in a case where tracks are arranged in a spiral shape at a track angle θ td that changes so that the difference angle θ df becomes 0° in the second data region UA2. The line L152 indicates a change in the difference angle θ df with respect to the radial position (hereinafter referred to as change in as a second difference angle θ df) in a case where tracks are arranged in a spiral shape at a track angle θ td that changes so that the difference angle θ df becomes the second boundary angle θ ba2 in the second data region UA2. The line L153 indicates a change in the difference angle θ df with respect to the radial position (hereinafter referred to as change in a third difference angle θ df) in a case where tracks are arranged in a spiral shape at a track angle θ td that changes so that the difference angle θ df becomes θ df2 in the second data region UA2. Here, 0<θ df2<θba2.

In the example shown in FIG. 15, as indicated by the change L151 in the first difference angle θ df, the user data controller 62 arranges the tracks in a spiral shape at the track angle θ td [θ td(r)=θ s(r), where r is the radial position] that changes such that the difference angle θ df becomes 0° in the second data region UA2. In this case, the difference angle θ df is 0° (θ df=0) in the second data region UA2, and is smaller than the second boundary angle θ ba2. As indicated by the change L152 in the second difference angle θ df, the user data controller 62 arranges the tracks in a spiral shape at the track angle θ td [θ td(r)=θ s(r)−θ ba2, where r is the radial position] that changes such that the difference angle θ df becomes the second boundary angle θ ba2 in the second data region UA2. In this case, the difference angle θ df is the second boundary angle θ ba2 (θ df=θ ba2) in the second data region UA2. As indicated by the change L153 in the third difference angle θ df, the user data controller 62 arranges the tracks in a spiral shape at the track angle θ td [θ s(r)−θ ba2<θ td(r)<θ s(r), where r is the radial position] that changes such that the difference angle θ df becomes the θ df2 in the second data region UA2. In this case, the difference angle θ df is θ df2 (0<θ df=θ df2<θba2) in the second data region UA2, and is smaller than the second boundary angle θ ba2. Therefore, in order to ensure the signal quality of the data at the time of reading, the user data controller 62 can adjust the length of tracks arranged in a spiral shape at a track angle in the range of θ s(r)−θ ba2 θ td(r)≤θ s(r) in the second data region UA2.

The command processor 63 processes the command received from the host 100. The command processor 63 includes a sector access processor 631, the command queue processor 632, a reordering processor 633, and a media cache (MC) access processing unit 634. The sector access processor 631 executes access processing to a particular sector according to the command. The command queue processor 632 queues commands. The reordering processor 633 executes reordering processing for a plurality of commands queued in the command queue processor 632. The reordering processor 633 performs, for example, reordering processing on a plurality of commands so as to perform processing from a command having a short time to access a designated sector. The MC access processor 634 executes access processing to the media cache, for example, to the system area SA and the second data region UA2 according to the command.

FIG. 16 is a diagram showing an example of an LBA according to the first embodiment. In FIG. 16, the LBA (Logical Block Address) is divided into a partition Part A and a partition Part B. The partition Part A corresponds to the first data region UA1. The LBA corresponding to the partition Part A includes, for example, 0000, 0001, 0002 to 0100 to 0200. The partition Part B corresponds to the second data region UA2. The LBA corresponding to Part B includes, for example, 0201, 0202 0203 to 300. In FIG. 16, the right hatched region indicates the LBA corresponding to the second data region UA2.

Upon receipt of a command from the host 100, the command processor 63 accepts the command from the host 100 when the command queue is vacant. The command processor 63 executes reordering processing for selecting a command whose access time is short from the command queue.

The command processor 63 divides the LBA into a partition Part A and a partition Part B. When the command processor 63 receives a command for accessing the partition Part A (hereinafter referred to as an A command) and a command for accessing the partition Part B (hereinafter referred to as a B command) from the host 100, the command processor 63 preferentially processes the A command. For example, when there is the A command at the time of reordering the command, the command processor 63 preferentially processes the A command by adding a weight to the access time by the B command. As an example, the command processor 63 adds a weight to the access time by the B command according to the following expression.

$$Tro = Tac \times Np \qquad \text{(Expression 1)}$$

where Tro is a value for determining the priority in reordering. The smaller the Tro, the higher the priority. Tac is a predicted access time to the sector corresponding to the LBA designated by the command. Np indicates the weight. When there is the A command at the time of reordering the command, the command processor 63 adds a weight to the B command according to the expression 1 so as to make it difficult for the processing of the B command to be selected.

Figure 17:
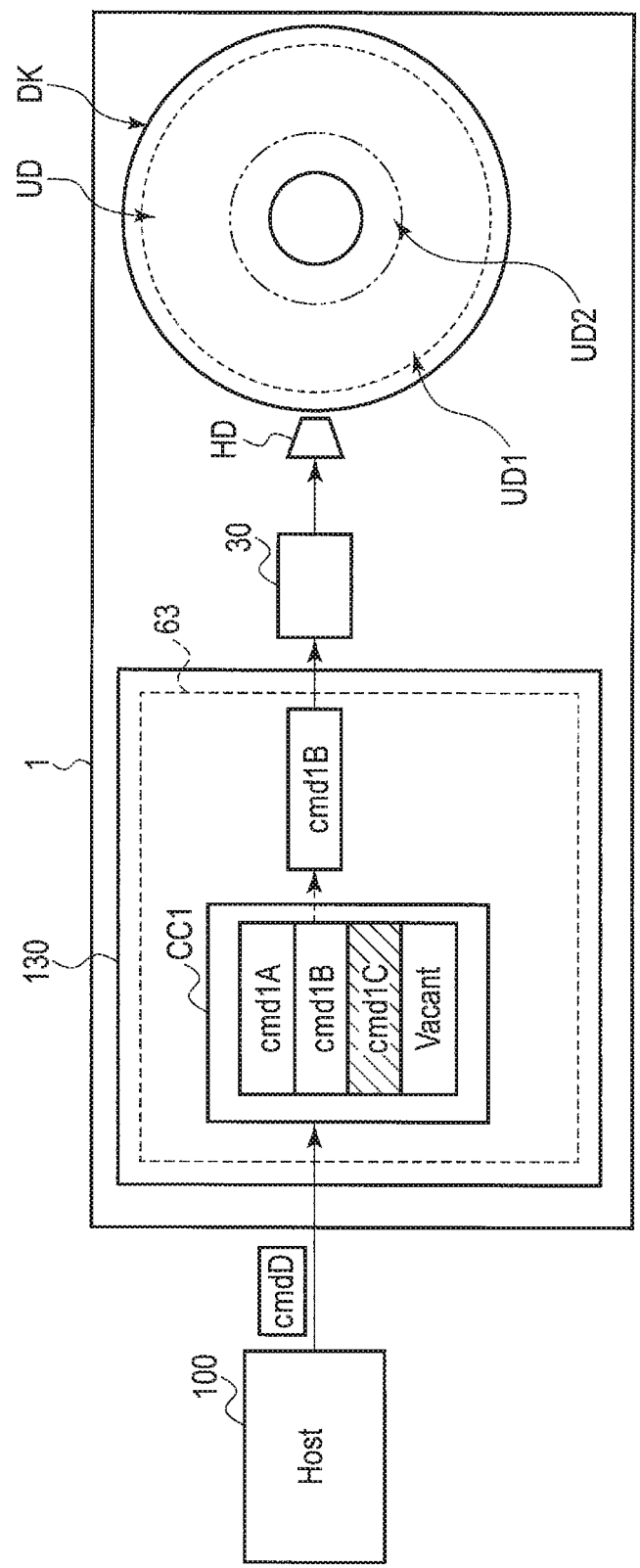
FIG. 17 is a diagram showing an example of command processing according to the first embodiment.

FIG. 17 is a diagram showing an example of command processing according to the first embodiment. In FIG. 17, the command processor 63 includes a cache CC1 that stores A command and B command. In FIG. 17, the plain command indicates the A command, and the right hatched command indicates the B command. It should be noted that the command processor 63 may have a cache for storing the A command and a cache for storing the B command separately. Further, for example, the host 100 may recognize the range between the partition Part A and the partition Part B of the LBA. In this case, the host 100 indicates, for example, the A command or the B command and inputs a command to the command processor 63.

In the example shown in FIG. 17, the command processor 63 stores the A command cmdD received from the host 100 in the cache CC1, and reorders the A command cmd1A, A command cmd1B, B command cmd1C, and A command cmd1D which have been stored. The command processor 63 determines that there is the A command in the plurality of commands stored in the cache CC1 at the time of reordering, adds a weight to the B command cmd1B, and preferentially processes the A command cmd1.

Figure 18:
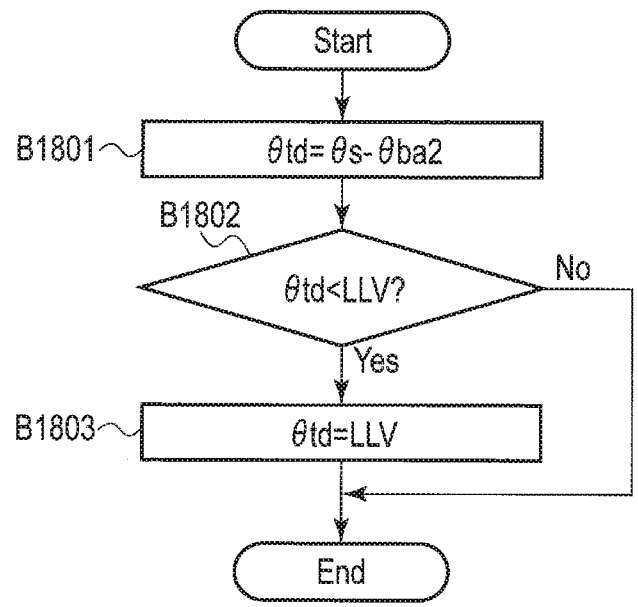
FIG. 18 is a flowchart showing an example of a track angle determination method according to the first embodiment.

FIG. 18 is a flowchart showing an example of a method of determining the track angle θ td according to the first embodiment.

The system controller 130 calculates the track angle θ td(r) based on the difference value between the skew angle θ s(r) at the radial position r of the current head HD and the second boundary angle θ ba2, for example, 15° in the second data region UA2 (B1801). The system controller 130 determines whether the track angle θ td(r) is smaller than the lower limit value LLV, or equal to or larger than the lower limit value LLV (B1802). When it is determined ("YES" in B1802) that the track angle θ td(r) is smaller than the lower limit value LLV, the system controller 130 determines that the lower limit value LLV is the track angle θ td(r) (B1803) and ends the process. When it is determined ("NO" in B1802) that the difference is equal to or larger than the lower limit value LLV, the system controller 130 determines that the difference value, θ s(r)−θ ba2, calculated in B1801 is the track angle θ td(r), and ends the process.

According to the present embodiment, the magnetic disk device 1 includes the actuator AC having an arm to which a head HD is attached at the tip, and the disk DK having the first data region UA1 and the second data region UA2. When the head HD is moved from the radial position OBP to the radial position IBP in the first data region UA1 by the actuator AC, the skew angle θ s of the head HD changes from the first boundary angle θ ba1 to the second boundary angle θ ba2. When the head HD is moved from the radial position IBP to the radial position IMP in the first data region UA1 by the actuator AC, the skew angle θ s of the head HD changes from the second boundary angle θ ba2 to the third boundary angle θ ba3. The magnetic disk device 1 writes the high access data (hot data) in the first data region UA1 and writes the low access data (cold data and/or warm data) in the second data region UA2. In addition, the magnetic disk device 1 writes data (track) in a spiral shape in the second data region UA2. The magnetic disk device 1 can randomly perform access at high speed in the first data region UA1 and can improve the reliability of the data written in the second data region UA2. Therefore, it is possible to provide the magnetic disk device 1 capable of efficiently writing data on the disk DK.

Next, a magnetic disk device according to modified examples and another embodiment will be described. In the modifications and other embodiments, the same reference numerals are attached to the same parts as those in the above embodiment, and a detailed description thereof will be omitted.

First Modification

The magnetic disk device 1 of a first modification is different from the above-described embodiment in the positioning control method of the head HD in the second data region UA2.

Figure 19:
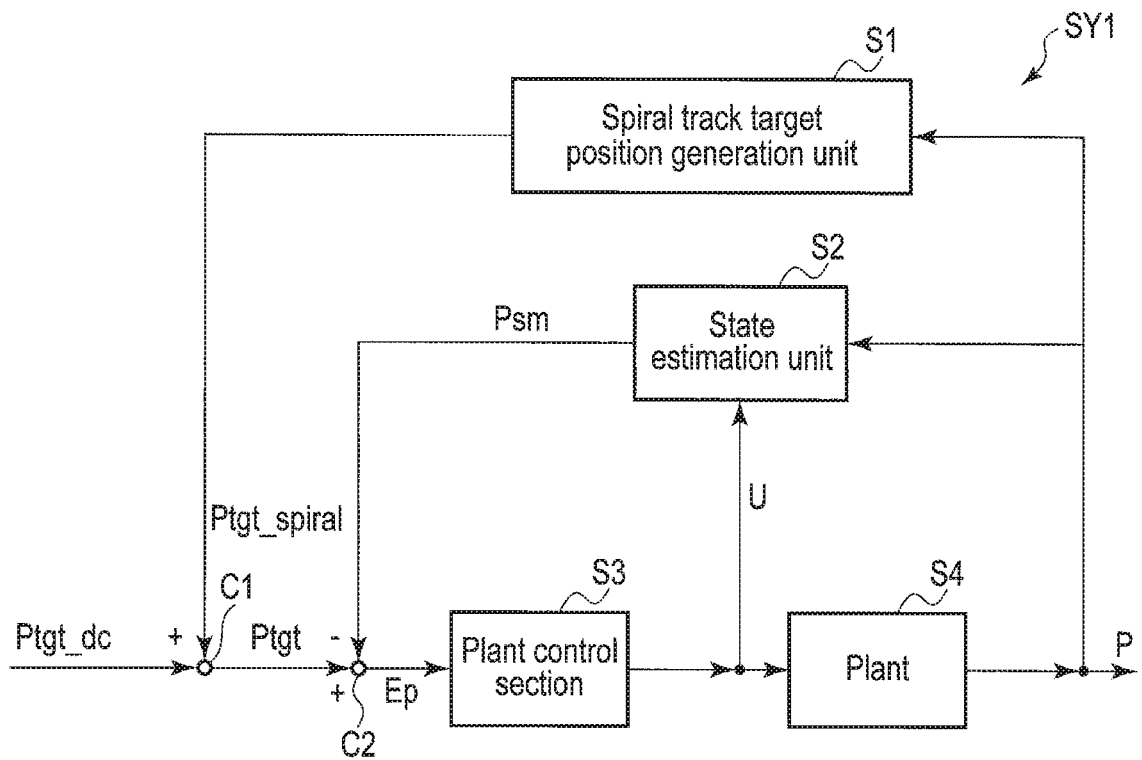
FIG. 19 is a block diagram showing an example of the positioning control system of the magnetic disk device.

FIG. 19 is a block diagram showing an example of a positioning control system SY1 of the magnetic disk device 1. FIG. 19 shows a control system that executes a feedback control system in tracking.

The magnetic disk device 1 has a plant control system (positioning control system) SY1 for positioning the head HD. The positioning control system SY1 includes a spiral track target position generation unit S1, a state estimation unit S2, a plant control unit S3, a plant S4, and calculation units C1 and C2. In one example, the spiral track target position generation unit S1, the state estimation unit S2, the plant control unit S3, and a calculation unit C1 are provided in the servo controller 61. For example, the plant S4 corresponds to the head HD, the actuator AC, and the like. The positioning control system SY1 executes feedback control.

The spiral track target position generation unit S1, in the second data region UA2, generates a target position (hereinafter referred to as a spiral position) Ptgt_spiral on the track in a spiral shape based on the current position P on the disk DK (hereinafter referred to as the actual position) of the plant S4. For example, the spiral track target position generation unit S1 calculates the skew angle θ s from the current radial position of the head HD, calculates the track angle θ td based on the calculated skew angle θ s and the second boundary angle θ ba2, and generates the next spiral position Ptgt_spiral based on the calculated track angle θ td.

The state estimation unit S2 is a state observer, and has a model of the plant S4 (hereinafter referred to as a plant model) and an internal state variable. The state estimating unit S1 estimates a target position Psm on the disk DK (hereinafter referred to as an estimated position) of the plant S4 in the sample of the servo next to the current servo (hereinafter referred to as a next sample) of the plant S4 based on the plant model, the internal state variable, the driving amount U (hereinafter referred to as actual driving amount) of the plant S4, and the actual position P of the plant S4.

The plant control unit S3, for example, controls the plant S4. The plant control unit S3, for example, generates the actual driving amount U of the plant S4 based on the estimated position error Ep. The plant control unit S3 may generate the actual driving amount U based on values other than the estimated position error Ep, for example.

The plant S4 is driven based on the actual driving amount U.

In the HDC 60, when a particular position (hereinafter referred to as a designated position) on the disk DK from which data is read or on which data is written is designated, the calculation unit C1 receives the designated position Ptgt_dc and the next spiral position Ptgt_spiral by feedback control. The calculation unit C1 outputs the target position Ptgt obtained by adding the spiral position Ptgt_spiral to the designated position Ptgt_dc to a calculation unit C2.

The state estimation unit S2 receives the actual position P and the actual driving amount U with respect to the position of the plant S4. The state estimation unit S2 outputs the estimated position Psm to the calculation unit C2. The calculation unit C2 receives the target position Ptgt and the estimated position Psm. The calculation unit C2 outputs the estimated position error Ep obtained by subtracting the estimated position Psm from the target position Ptgt to the plant control unit S3.

The plant control unit S3 receives the estimated position error Ep. The plant control unit S3 outputs the actual driving amount U to the plant S4. The plant S4 is driven according to the actual driving amount U and moves to the actual position P. It should be noted that the actual driving amount U corresponds to the current value for driving the VCM 14, for example.

Figure 20:
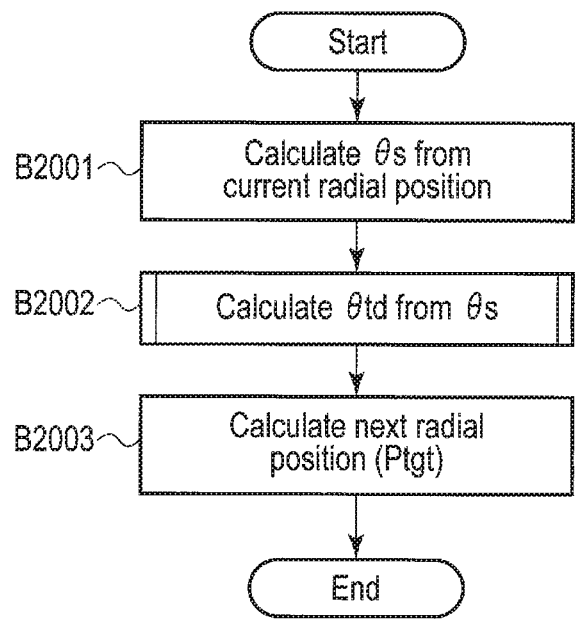
FIG. 20 is a flowchart showing an example of a head positioning control method in the second data region according to a first modification.

FIG. 20 is a flowchart showing an example of the positioning control method of the head HD in the second data region UA2 according to the first modification.

The system controller 130 calculates the skew angle θ at the current radial position of the head HD (B2001). The system controller 130 calculates the track angle θ td based on the skew θ s (B2002). For example, the system controller 130 calculates (determines) the track angle based on the method shown in the flowchart of FIG. 18. The system controller 130 calculates the radial position (target position) Ptgt of the next head HD (B2003) and ends the process.

According to the first modification, the magnetic disk device 1 can position the head HD at a target position on the tracks in a spiral shape in the second data region UA2. Therefore, the magnetic disk device 1 can improve the accuracy of servo control.

Second Modification

In the magnetic disk device 1 of a second modification, the configuration of the disk DK is different from those of the above-described embodiment and modification.

Figure 21:
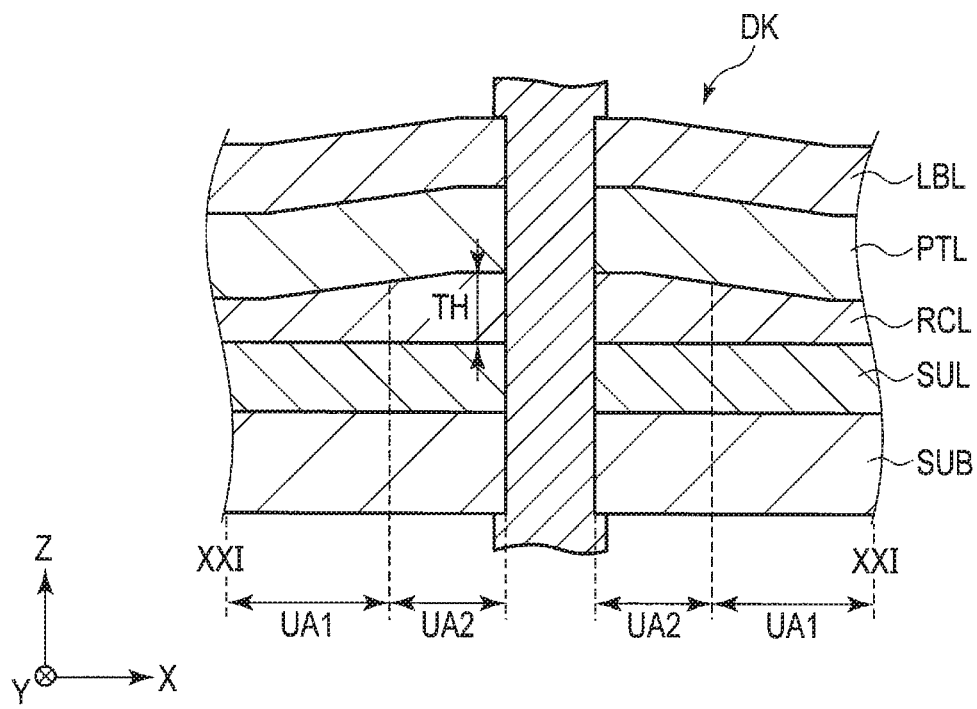
FIG. 21 is a cross-sectional view schematically showing an example of a configuration of a disk according to a second modification.

FIG. 21 is a cross-sectional view schematically showing an example of a configuration of a disk DK according to the second modification. FIG. 21 schematically shows a cross section taken along line XXI-XXI shown in FIG. 2.

In the example shown in FIG. 21, the disk DK includes a non-magnetic substrate SUB, a soft magnetic layer SUL (Soft Under Layer) as a underlayer, a recording layer RCL, a protective layer PTL, and a lubricating layer LBL all of which are laminated in this order. That is, the soft magnetic layer SUL is laminated on the surface of the substrate SUB, the recording layer RCL is laminated on the surface of the soft magnetic layer SUL, the protective layer PTL is laminated on the surface of the recording layer RCL, and the lubricating layer LBL is laminated on the surface of the protective layer PTL. The recording layer RCL holds data by controlling the magnetization in the vertical direction by the recording magnetic field applied from the recording magnetic pole constituting the write head WH. For the thickness TH of the recording layer RCL, the second data region UA2 is thicker than the first data region UA1. Further, the thickness of the protective layer PTL is the same in the first data region UA1 and the second data region UA2, and according to the change in the thickness TH of the recording layer RCL, the second data region UA2 rises higher than the first data region UA1. The thickness of the lubricating layer LBL is also the same in the first data region UA1 and the second data region UA2 and rises at the second data region UA2 higher than at the first data region UA1 according to the change in the thickness TH of the recording layer RCL.

In the second data region UA2, the low access data (cold data and/or warm data) is written. Because of this, the data written in the second data region UA2 should be stored for a long time. Thus, the second data region UA2 is designed to have a high thermal stability, compared with the first data region UA1, so that it is possible to store data for a long time in the second data region UA2. The thermal stability of recording media such as a disk DK is represented by KuV/kbT. Here, Ku is the magnetic anisotropy energy of the magnetic particles of the recording layer RCL, V is the volume of the magnetic particles of the recording layer RCL, kb is the Boltzmann constant, and T is the temperature. According to this equation, in order to improve the thermal stability, for example, the volume V of magnetic particles (=the film thickness of the recording layer RCL multiplied by the area of the magnetic particles of the recording layer RCL) is increased. As compared to the case where the thickness TH of the recording layer RCL of the second data region UA2 is substantially equal to the thickness of the recording layer RCL of the first data region UA1, the thermal stability of the second data region UA2 can be improved in the case where the thickness TH of the recording layer RCL of the second data region UA2 is greater than the thickness of the recording layer RCL of the first data region UA1. Therefore, in the second modification, the recording layer RCL has a larger thickness TH in the second data region UA2 than in the first data region UA1.

FIG. 22 is a diagram showing an example of a change in the thickness TH of the disk DK according to the second modification. In FIG. 22, the line L221 shows the change in the thickness TH of the disk DK from the first data region UA1 to the second data region UA2 according to the second modification. A line L222 indicates the thickness TH (=TH0) of the disk DK when the disk DK does not change from the first data region UA1 to the second data region UA2.

In the example shown in FIG. 22, the thickness of the disk DK according to the second modification gradually increases from the thickness TH0 of the radial position OP1 of the first data region UA1 toward the thickness TH1 of the radial position IMP of the second data region UA2

According to the second modification, in the magnetic disk device 1 includes the disk DK where the thickness TH of the recording layer in the second data region UA2 for writing the low access data (cold data and/or warm data) is thicker than the thickness TH of the recording layer of the first data region UA1 in which the high access data (hot data) is written. Therefore, the magnetic disk device 1 can stably store data in the second data region UA2 over a long period of time.

Second Embodiment

A magnetic disk device 1 of a second embodiment is different from the above-described embodiment and modification in that the interface (IF) for receiving the A command and the B command are separately provided.

Figure 23:
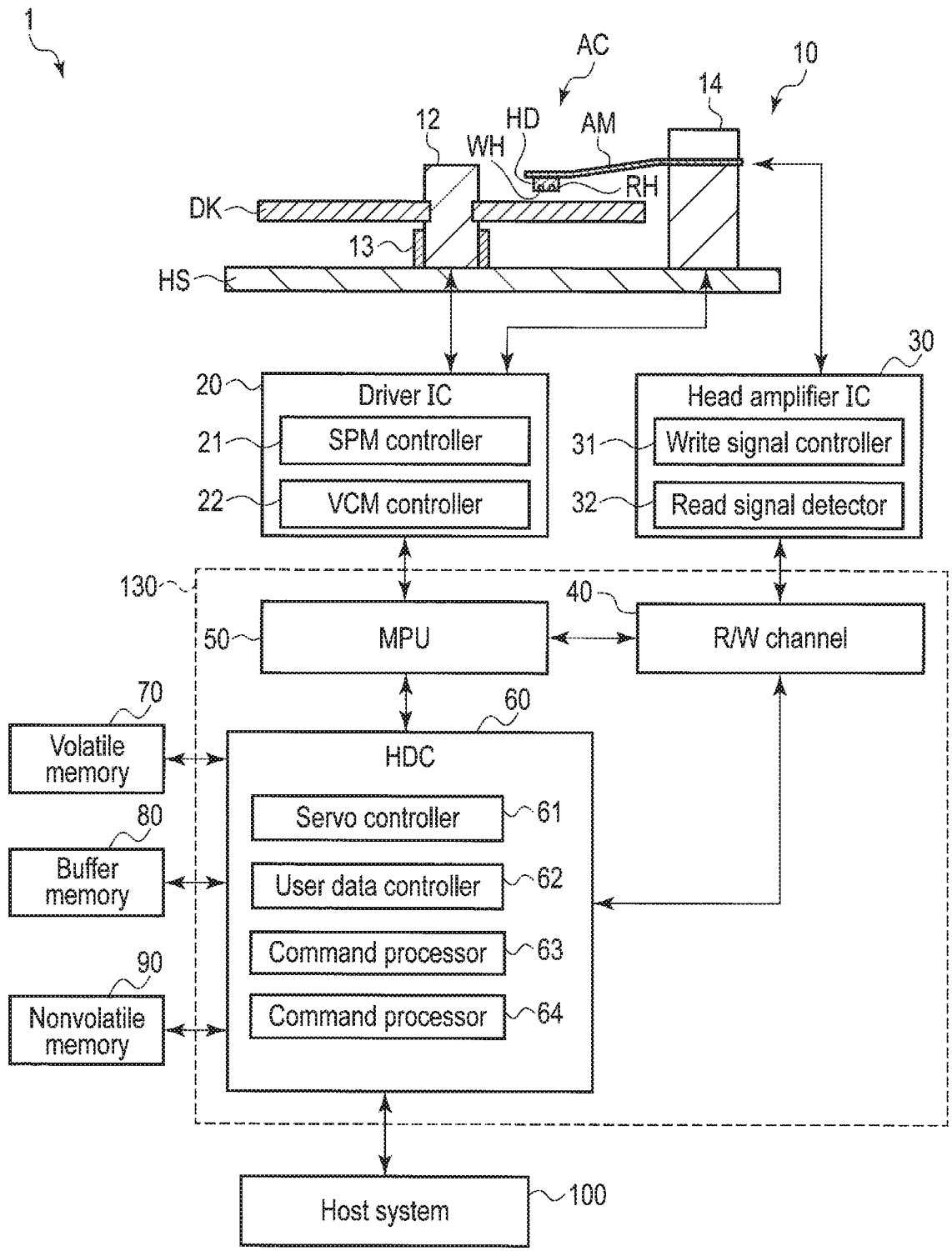
FIG. 23 is a schematic diagram showing an example of a configuration of a magnetic disk device according to a second embodiment.

FIG. 23 is a schematic diagram showing an example of the configuration of the magnetic disk device 1 according to the second embodiment.

An HDC 60 further includes a command processor 64. The command processor 64 has the same configuration as a command processor 63. That is, the command processor 64 includes a sector access processor, a command queue processor, a reordering processor, and an MC access processor.

FIG. 24 is a diagram showing an example of an LBA according to the second embodiment. In FIG. 24, the LBA is separately and independently allocated to the drive A and the drive B. The drive A corresponds to the first data region UA1, and corresponds to the command processor 63, for example. The drive B corresponds to the second data region UA2, for example, corresponds to the command processor 64. The LBA corresponding to the drive A includes 0000, 0001, 0002 to 0100 to 0200. The LBA corresponding to the drive B includes 0000, 0001, 0002 to 0100. In FIG. 24, the right hatched region indicates the LBA corresponding to the second data region UA2.

In an example shown in FIG. 24, in the system controller 130 (HDC 60), the A command is input to the drive A by the host 100, and the B command is input to the drive B by the host 100. The system controller 130 preferentially processes the A command. The system controller 130 determines whether the A command is stored in the drive A. When it is determined that the A command is stored in the drive A, the system controller 130 processes the A command and does not process the B command stored in the drive B. When it is determined that the A command is not stored in the drive A, the system controller 130 processes the B command stored in the drive B.

FIGS. 25 and 26 are diagrams showing an example of command processing according to the second embodiment. In FIGS. 25 and 26, the command processor 63 includes the cache CC1 that stores the A command and an interface IF1 that is connected to the host 100. The command processor 64 includes a cache CC2 for storing the B command and an interface IF2 connected to the host 100. In FIGS. 25 and 26, the plain command indicates the A command, and the right hatched command indicates the B command. In the example shown in FIG. 25 and FIG. 26, for the system controller 130, the command processor 63 receives the A command from the host 100 via the interface IF1, and to the command processor 64 receives the B command from the host 100 via the interface IF2.

In the example shown in FIG. 25, the system controller 130 (HDC 60) determines that the A command is stored in the cache CC1 of the command processor 63 corresponding to the drive A, and reorders a plurality of A commands stored in the cache CC1 and processes the A command cmd1B. At this time, the system controller 130 does not process the B command stored in the cache CC2 of the command processor 64 corresponding to the drive B.

In the example shown in FIG. 26, the system controller 130 (HDC 60) determines that the A command is not stored in the cache CC1 of the command processor 63 corresponding to the drive A, and reorders a plurality of B commands stored in the cache CC2 and processes the B command cmd2B.

FIG. 27 is a flowchart showing an example of command processing according to the second embodiment.

The system controller 130 determines whether the A command is stored in the cache CC1 of the A drive (B2701). When it is determined that the A command is stored ("YES" in B2701), the system controller 130 processes the A command (B2702) and ends the process. When it is determined ("NO" in B2702) that the A command is not stored, the system controller 130 determines whether the B command is stored in the cache CC2 of the B drive (B2703). When it is determined ("YES" in B2703) that the B command is stored, the system controller 130 processes the B command (B2704) and ends the process. When it is determined ("NO" in B2703) that the B command is not stored, the system controller 130 ends the process.

According to the second embodiment, the magnetic disk device 1 includes an interface (IF) for receiving the A command and an interface (IF) for the B command separately. Therefore, the magnetic disk device 1 can efficiently access the first data region UA1 and the second data region UA2.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A magnetic disk device comprising:
   a disk including a first region and a second region different from the first region;
   a head that writes data on the disk and reads data from the disk;
   an actuator that positions the head on the disk; and
   a controller which positions the head by driving the actuator and writes data in the first region and the second region with the head, wherein
   a skew angle of the head with respect to a circumferential direction of the disk varies within a first angle in the first region, and varies, in the second region, from a second angle larger than the first angle to a third angle larger than the first angle and the second angle,
   a thickness of the second region is greater than that of the first region, and
   the controller writes first data to be accessed at a first number of times in a first period in the first region, and writes second data to be accessed at a second number of times smaller than the first number of times in the first period in the second region.
2. The magnetic disk device according to claim 1, wherein the first data includes the first user data to be accessed at the first number of times in the first period, and the second data includes at least one of media cache data, system information, and the second user data to be accessed at the second number of times in the first period.

* * * * *